May 31, 1927.

A. B. FOWLER 1,630,564

HEEL FINISHING MACHINE

Original Filed Jan. 13, 1920　　13 Sheets-Sheet 1

INVENTOR
Alfred B. Fowler

May 31, 1927.

A. B. FOWLER 1,630,564

HEEL FINISHING MACHINE

Original Filed Jan. 13, 1920    13 Sheets-Sheet 2

INVENTOR
Alfred B. Fowler

May 31, 1927.

A. B. FOWLER 1,630,564

HEEL FINISHING MACHINE

Original Filed Jan. 13, 1920   13 Sheets-Sheet 6

INVENTOR
Alfred B. Fowler

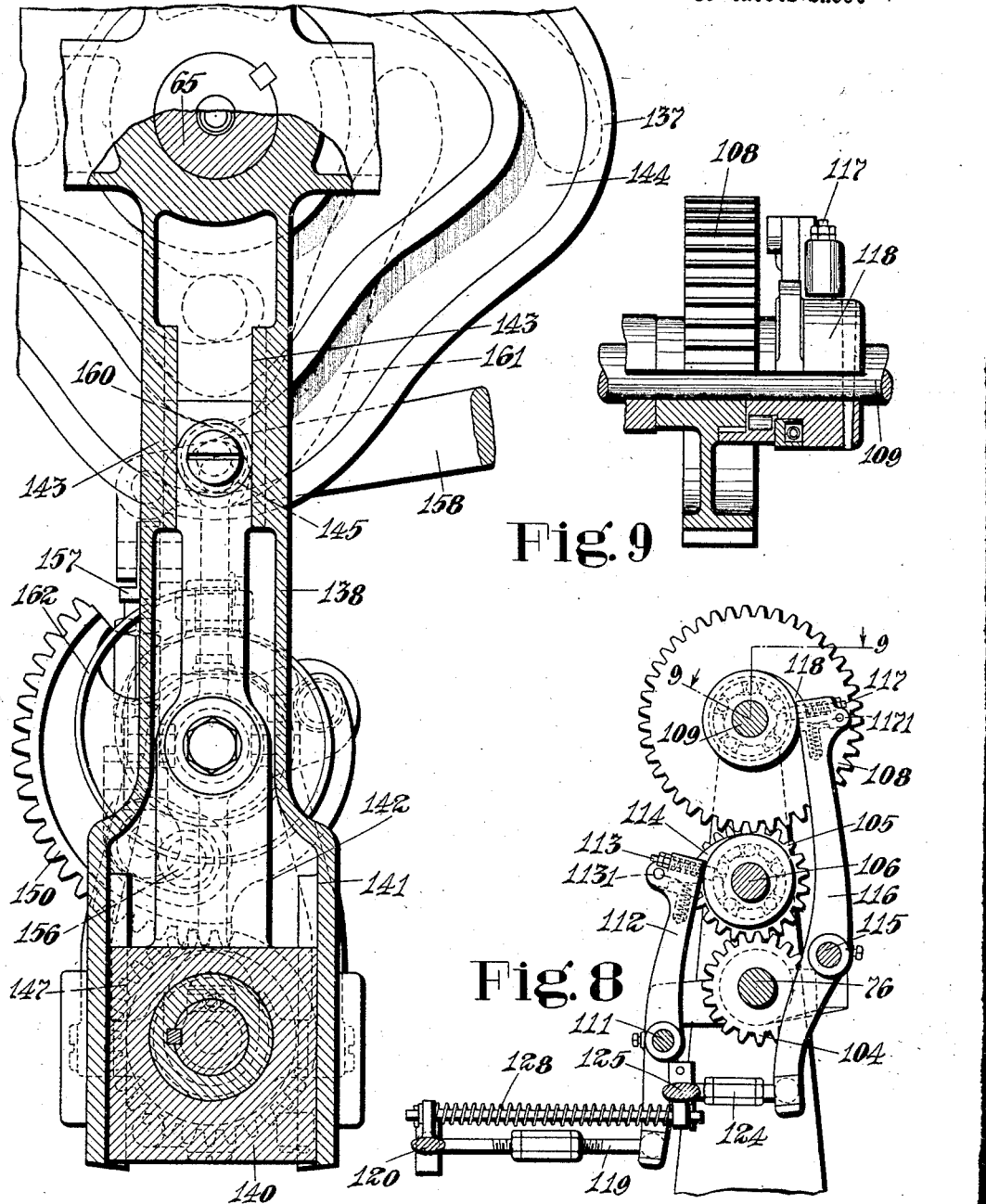

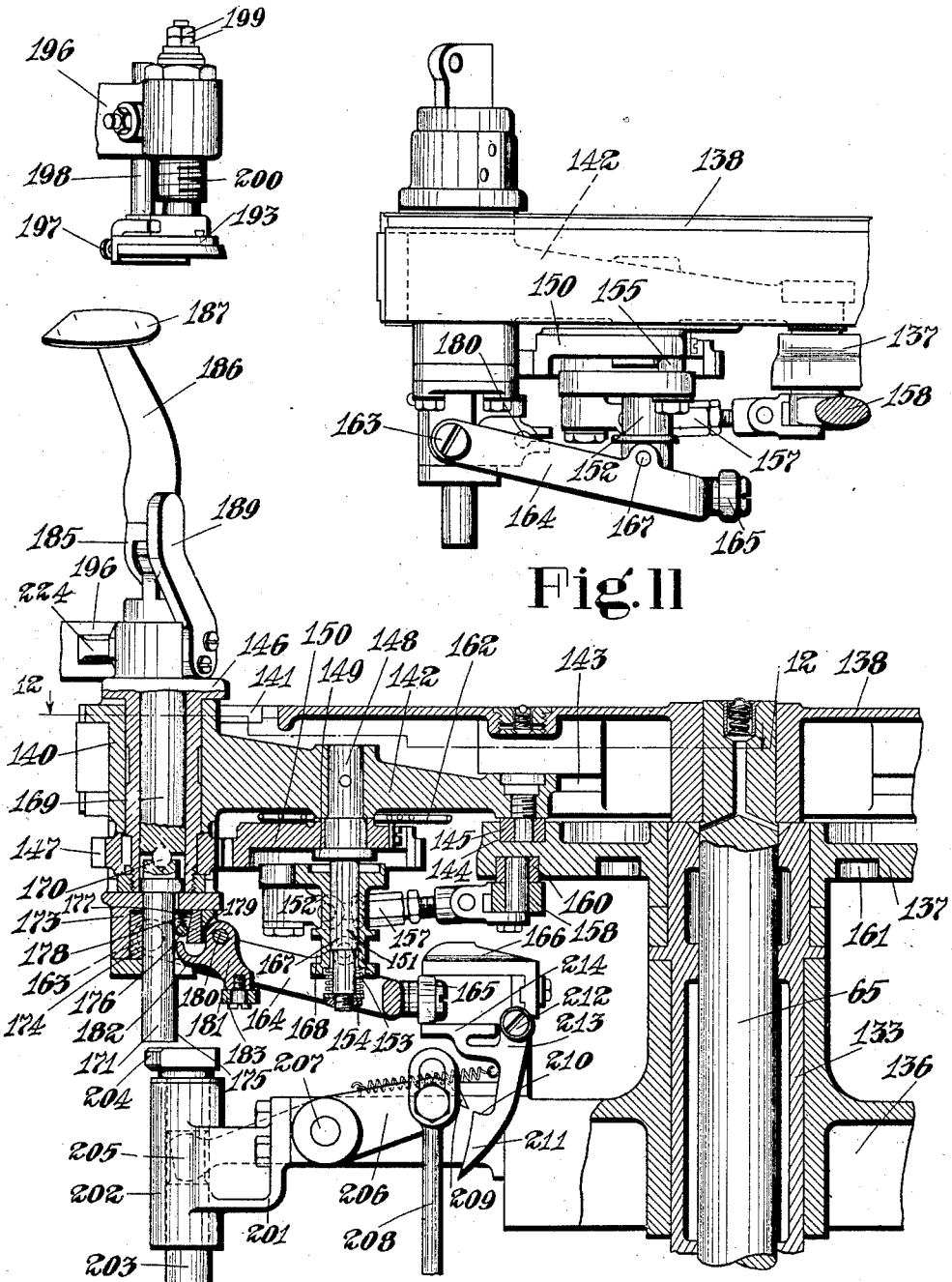

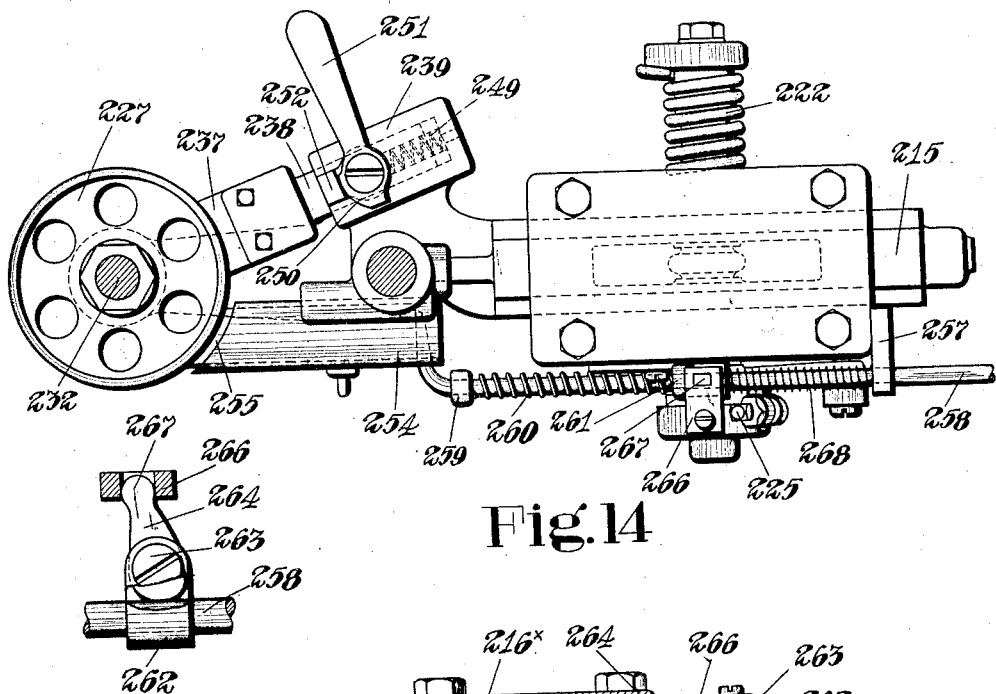
Fig.14
Fig.16
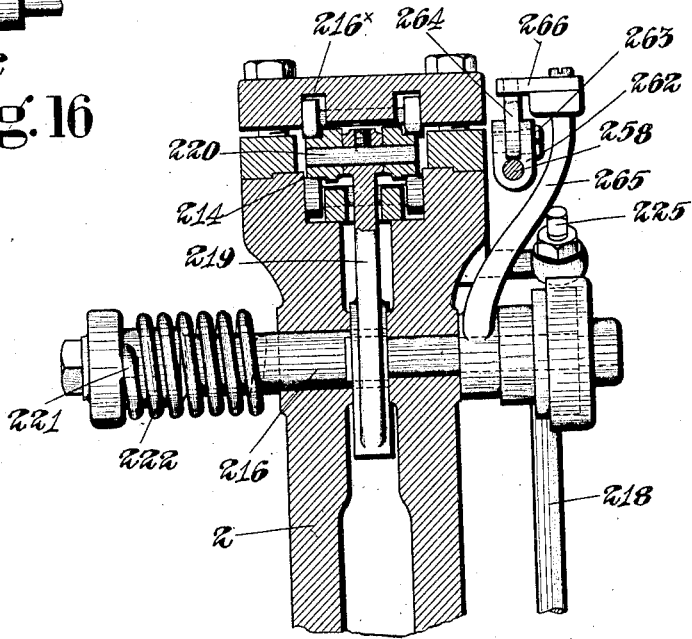
Fig.15

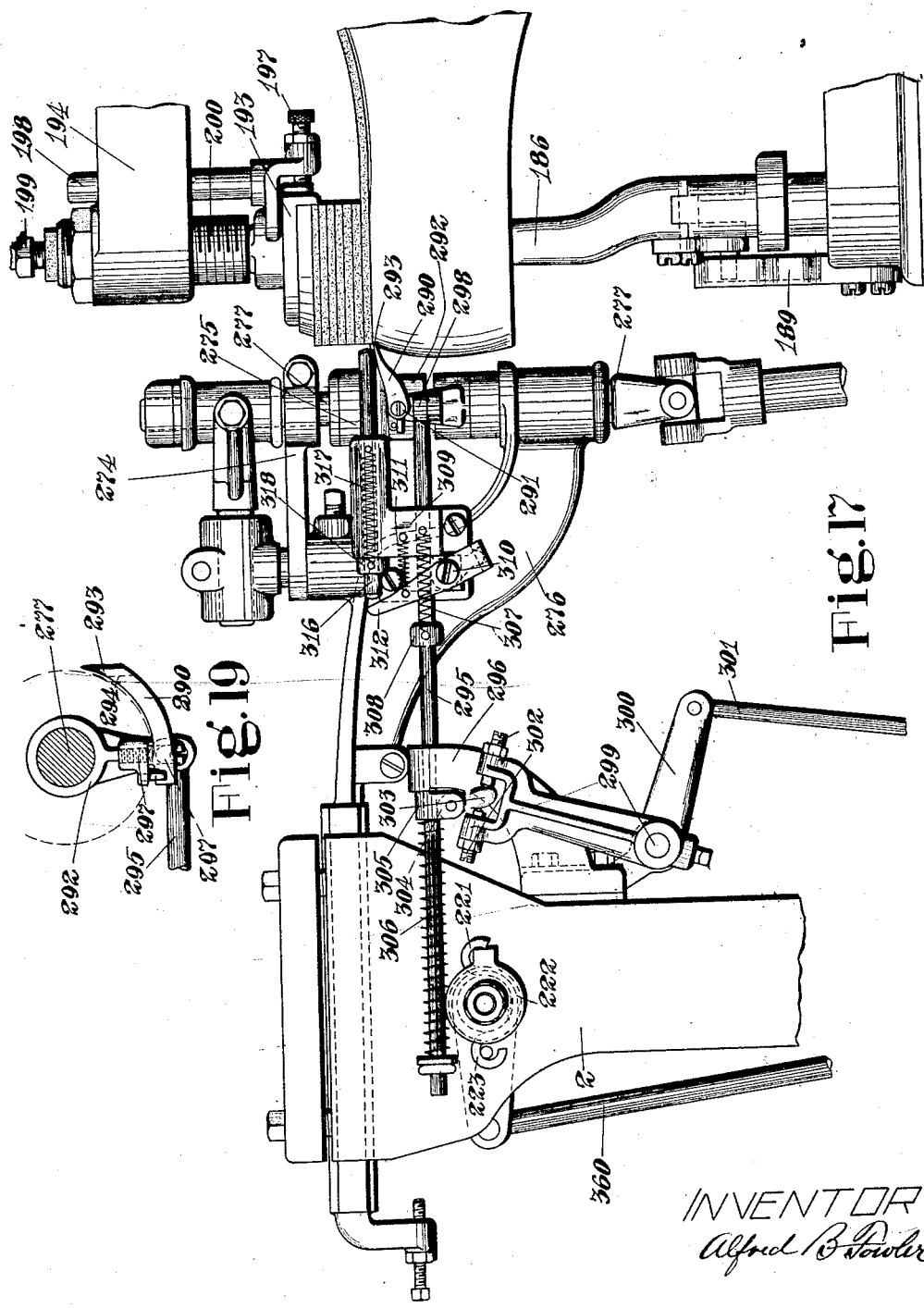

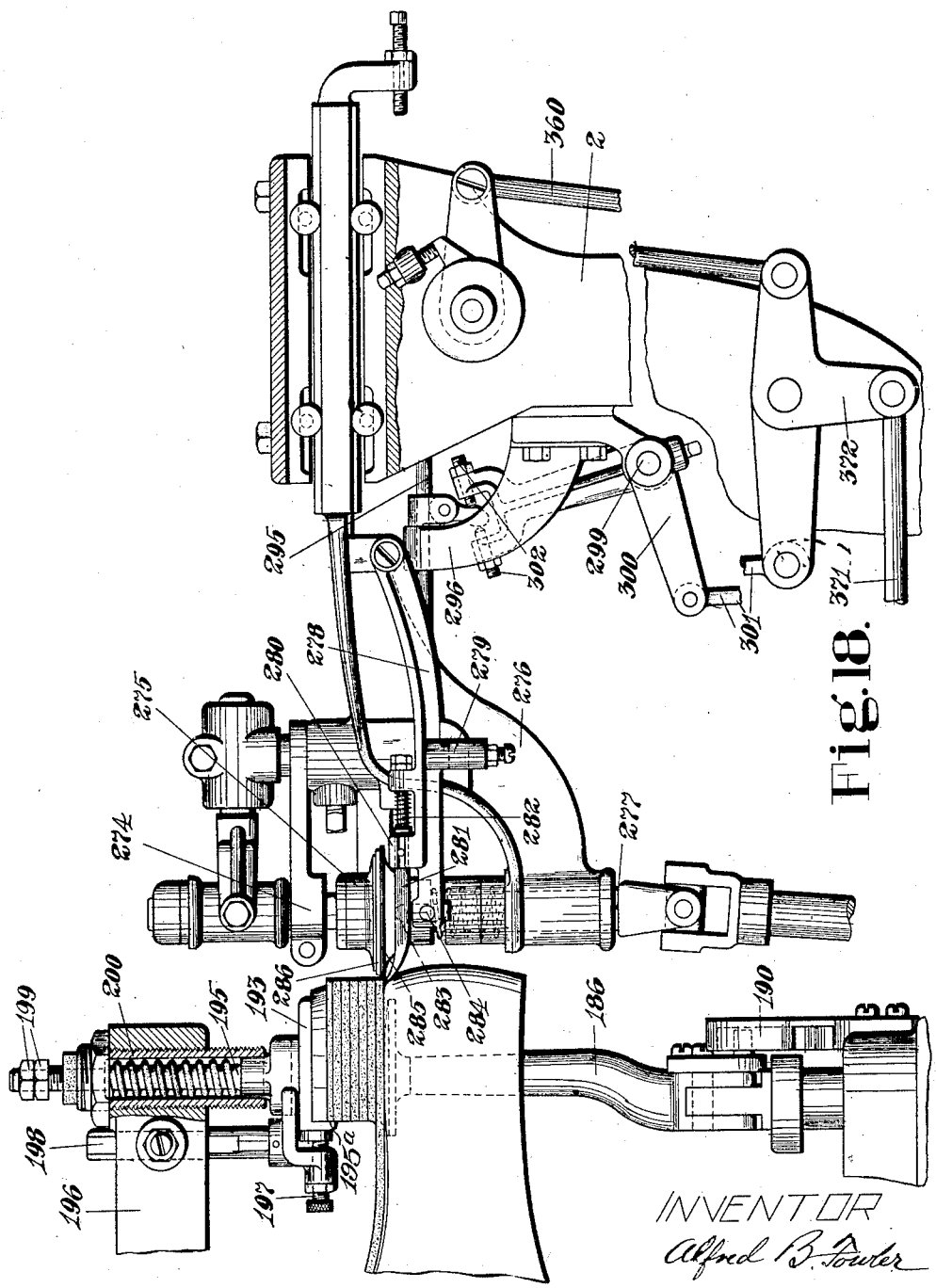

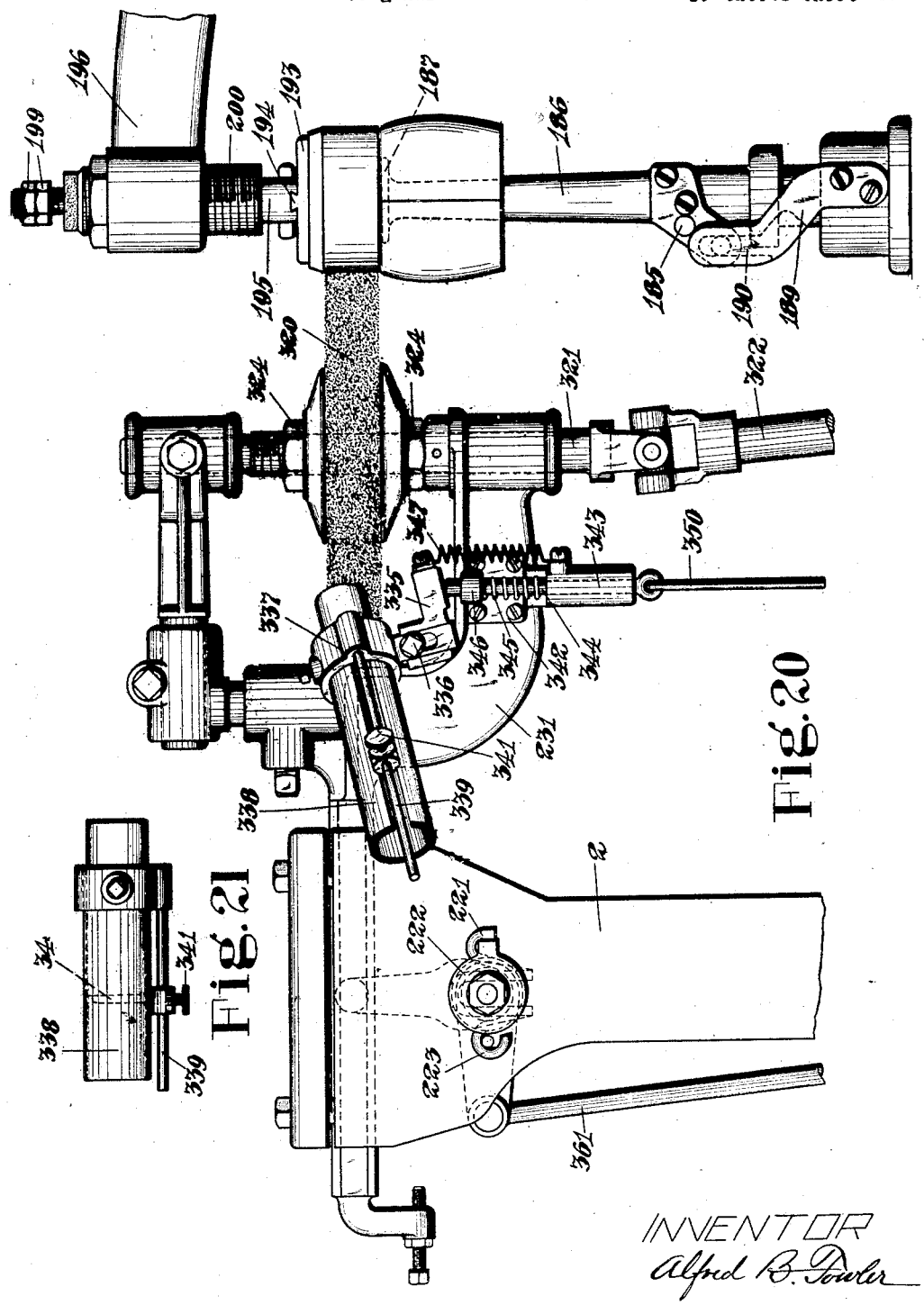

Patented May 31, 1927.

1,630,564

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

HEEL-FINISHING MACHINE.

Application filed January 13, 1920, Serial No. 351,117. Renewed May 28, 1926.

My invention hereinafter described relates to machines for manufacturing shoes, and more particularly to machines for treating or finishing the heels of shoes.

An object of my invention is to provide an improved machine for performing a finishing operation, or finishing operations, upon the contour surface of a heel, that is upon the surface between the edges of the tread and the heel seat and extending about the periphery of the heel from one breast corner to the other.

The illustrated machine provides a burnishing tool, a beading tool and a polishing tool, which are operated continuously at a uniform speed. In operative relation to the tool is a rotatable work-carrying table upon which work-supporting jacks are rotatably and slidably mounted to allow relative movement of a piece of work and the particular tool to which the work is being presented. In accordance with one feature of the invention, mechanism is provided for effecting this relative movement in such a fashion, as each of the tools acts upon a heel, that the tool is caused to treat equal areas of the heel surface in equal units of time from one breast corner to the other. By means of this arrangement uniformity of treatment of different parts of a heel is assured and any possibility of too fast a relative movement between the work and the tool in any particular spot is avoided.

A feature of the invention consists in the provision of improved means, organized to move over the work without damage thereto and arranged to control the position of an operating tool movable with said means by reference to a characteristic of the work whereby the tool is brought into the desired relation to the work. In the illustrated machine, a slidingly mounted feeler member is provided, of a form to move over the curve of the upper into the rand crease, said member and the finishing tool it controls being arranged for floating movement in determined relation so that as the feeler member enters the rand crease the finishing tool is brought into correct position to perform its operation, as, for example, the beading of the heel.

My invention also contemplates, among other things, the use of a heel finishing tool, illustrated as a beading tool, provided with a flange which enters the rand crease, as for finishing the chamfered edge of the sole and guiding the tool in its operation on the heel. When, near the end of their relative movement, the tool, moving relatively in the direction of the toe of the shoe, approaches the corner at the breast of the heel, there is danger if the bevelled end of the welt is, as sometimes happens, at all separated from the sole, of the flange of the tool being deflected from its proper course, the bevelled end of the welt acting as a switch, and thereby marring the edge of the sole. To avoid this, a feature of my invention consists in the provision of means arranged to be brought into operation at the critical moment to press the end of the welt firmly against the sole thus ensuring that the flange of the tool engages the surface of the welt remote from the sole, thereby preventing any marring or defacement of the shoe by the flange of the tool.

In performing certain heel finishing operations it is necessary or desirable to apply wax to the surface to be finished and this may conveniently be done by bringing a stick or other piece of wax into contact with the finishing tool, which transfers a film of the wax to the heel and rubs it in to the surface thereof. To obtain the best results it is necessary that the quantity of wax applied to the tool be controlled, according to the operation to be performed, with a considerable degree of nicety. An excess of wax not only is detrimental to the finishing of the heel, but undesirably increases the cost of the finishing operation, some of the waxes used being quite expensive. In certain finishing operations, for example in the final polishing which in the illustrated machine is done with a rotary brush, it is desirable to apply only a minute quantity of wax.

To this end the illustrated machine is provided with a treadle which, in its normal machine controlling operation, is displaced and then immediately released to initiate the operation of the machine after each shoe has been jacked. Accordingly, in the disclosed exemplification of the invention a stick of wax is arranged to be moved into contact with the polishing brush and held in such contact only during the very short time that the treadle is in displaced position.

In other heel finishing operations, for example in burnishing, it is desirable to use more wax than in the final polishing, but still considerably less than would be taken up by the finishing tool if the wax were held continuously in contact therewith. I have found that this may be satisfactorily accomplished by holding the wax in contact with the finishing tool only during the time that the tool is in operative relation to the heel and withdrawing it from the tool between the finishing operations on different heels. Accordingly, the illustrated machine is provided with means for applying wax to a heel finishing tool while said tool is in heel finishing position, arranged to permit the wax to rebound from the tool when the tool has finished its operation upon each heel.

The above and other novel features of the invention, and new combinations of parts will be hereinafter described in connection with a machine for burnishing, beading and polishing the heels of shoes, but obviously the character of the tools may be varied within the true scope of the several features of the invention as defined in the claims.

Fig. 8 is a section on the line 8—8 of Fig. 5;

Fig. 9 is a section on the line 9—9 of Fig. 8;

Fig. 10 is a section on the line 10—10 of Fig. 3;

Fig. 11 is a detail side elevation showing certain portions of the jack controlling devices;

Fig. 12 is an enlarged horizontal section on the line 12—12 of Fig. 10;

Fig. 14 is a horizontal section on the line 14—14 of Fig. 13;

Fig. 15 is a vertical section approximately on the line 15—15 of Fig. 13;

Fig. 16 is a detail view of a clutch member used to control the motion of certain rods used in different parts of the machine;

Fig. 17 is an elevation of the beading tool and parts of its operating and controlling mechanism, showing also part of a jacked shoe in position to be operated upon by the tool;

Fig. 18 is a side elevation of the same parts looking in the opposite direction from Fig. 17 and being partly in section to show certain portions of the internal construction thereof;

Fig. 19 is a plan view of the welt end engaging device used in conjunction with the beading tool;

Fig. 20 is an elevation of the polishing brush and its wax applying means with portions of its operating and controlling mechanism, showing the same in polishing relation to a jacked shoe;

Fig. 21 shows the wax holder for presenting wax to the polishing brush.

The present invention contemplates a table or carrier for a plurality of shoe supports on which shoes may be jacked for successive treatment by a series of tools mounted independently of and about the table. The tools may be varied to suit the conditions of work intended to be performed upon the heels of boots and shoes presented to them by the shoe supports, but in the present instance of the invention the tools are shown as consisting of a burnishing tool for burnishing the contour surface of the heel from one breast corner to the other, a beading tool for beading the surface of the heel adjacent to the rand crease of the shoe and a polishing brush for polishing the contour surface after treatment by the burnishing and the beading tools, and while the invention is peculiarly advantageous in connection with tools of the described character it is to be understood that it may also be advantageously employed in connection with other forms or kinds of tools. The tools, regardless of their particular character, are preferably rotated or operated continuously and means are provided for periodically moving the table or carrier to present the heels of jacked shoes successively to the different operating tools, and then automatically to suspend the table movement and to actuate the jacked shoes while in operative relation to the tools for effecting in a unit of time treatment of the same extent of contour surface of the heels. When the respective shoes have been treated by the tools, the table or carrier is automatically moved to advance the shoes to the next tools of the series and to present a finished shoe to a jacking station where it is to be removed and another shoe substituted for it.

These various features and the novel combinations of parts for effecting the purposes stated, will be made clear from the following description in connection with the embodiment of the invention shown in the accompanying drawings.

Figure 2:
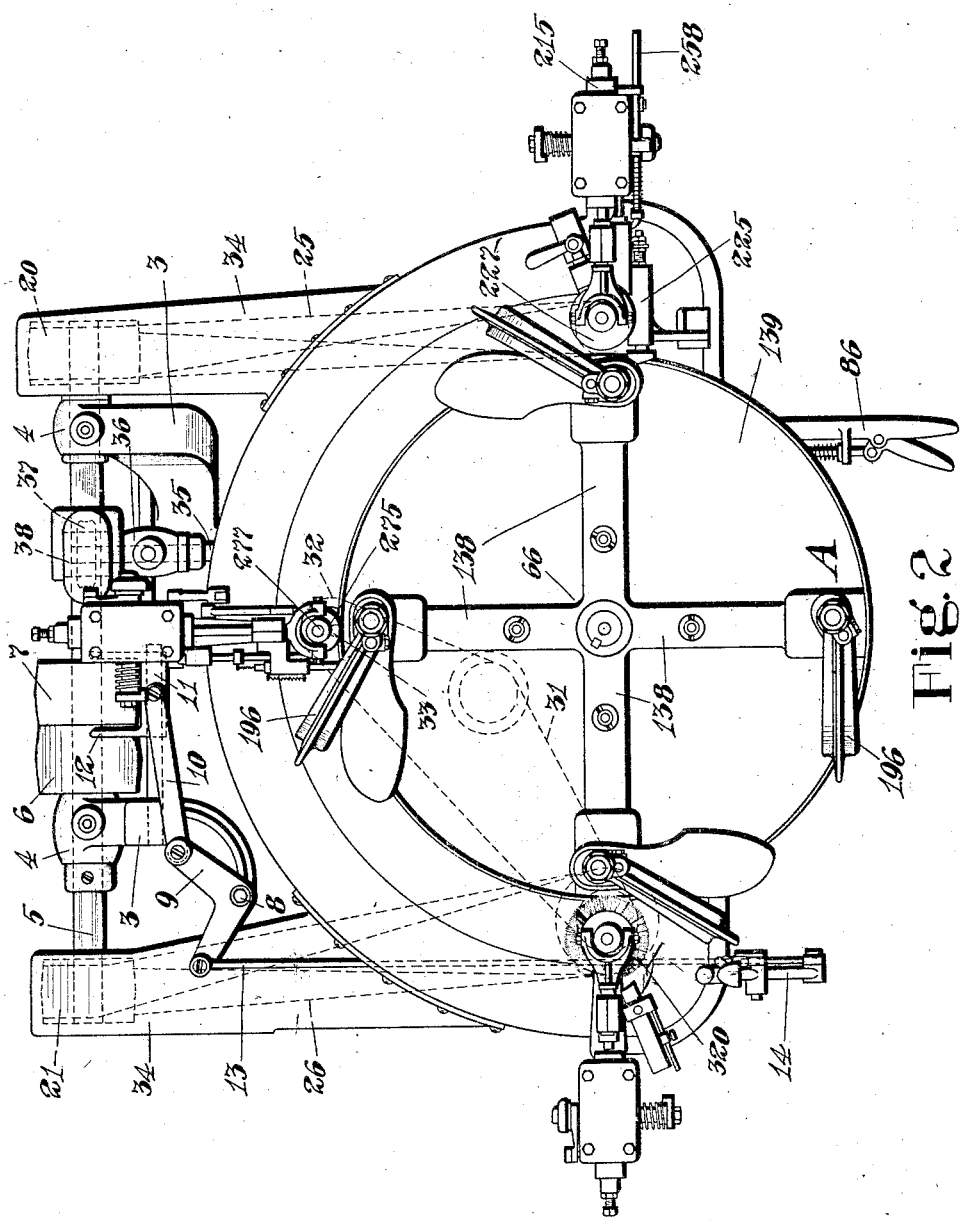
Fig. 2 is a plan view of the same.

The machine frame may be of any suitable character to properly support the operating parts and as shown comprises a base 1 from which rise the tool supporting standards 2 and the rearwardly extending arms 3, Fig. 2, carrying bearings 4 for a driving shaft 5 on which are mounted fast and loose pulleys 6, 7, adapted to be operated by a belt connected with a suitable source of power. Pivotally mounted at 8 on the arm 3 is a bell crank lever 9, Fig. 2, one end of which is connected by a link 10 to a slide 11 carrying the belt shifter 12. The other arm of the bell crank lever 9 is connected by a rod 13, Fig. 2, to a belt shipper handle 14, Figs. 2 and 3, pivotally mounted at 15 on a part of the machine frame and having a locking member 16 adapted to engage suitable notches in a locking segment 17 secured to a bracket 18 mounted on the machine frame. The locking member 16 is connected to a pivoted hand piece 19 the construction being such that upon manipulation of the shipper handle 14 the belt may be moved from the fast to the loose or from the loose to the fast pulley and the shipper handle locked in the desired position.

Figure 3:
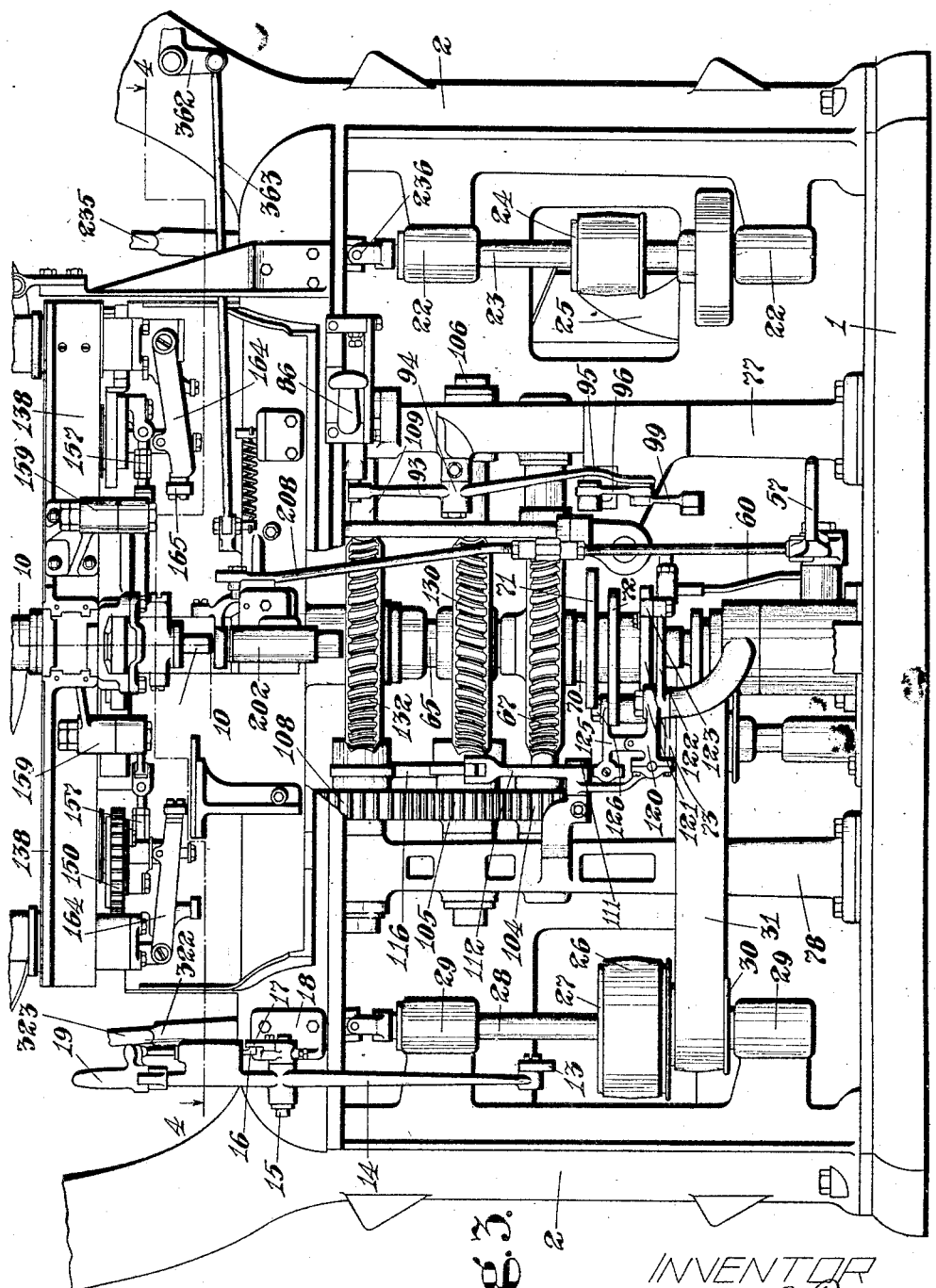
Fig. 3 is an enlarged front elevation of the lower part of the machine with the cover plates removed.

Secured to the drive shaft 5 are the belt pulleys 20 and 21, Fig. 2, from which the tool shafts are operated when the driving shaft 5 is driven as hereinbefore explained. Mounted in suitable bearings 22 (Fig. 3) extending from one of the risers or tool supporting standards 2 is a tool driving shaft 23, Fig. 3, having a pulley 24 driven by a belt 25, Figs. 2 and 3, from the pulley 20 on the drive shaft 5. Likewise, the pulley 21 on the drive shaft is connected by a belt 26, Figs. 2 and 3, to a pulley 27 on a tool shaft 28 journalled in bearings 29 extended from another of the tool supporting standards 2, as indicated in Fig. 3. The shaft 28 carries a pulley 30 about which passes a belt 31 connected to a pulley 32 on a tool shaft 33, Fig. 2, mounted between and to the rear of the tool shafts 23 and 28 heretofore described, the construction being such that as long as the drive shaft 5 is driven the tool shafts 23, 28 and 33 will be continuously driven to operate their respective tools as will more fully hereinafter appear. If desired, guard plates 34, Fig. 2, may be secured to the machine frame and extend over the belts 25 and 26.

The motion of the drive shaft 5 is imparted to the mechanism for controlling the table or carrier and the jacks or work supports through a shaft 35, Fig. 2, mounted in appropriate bearings 36 and having mounted thereon a worm wheel 37 in operative engagement with a worm 38 on the drive shaft 5, substantially as indicated in Fig. 2, the construction being such that so long as the drive shaft 5 is actuated the motion transmission shaft 35 will also be actuated.

Figure 7:
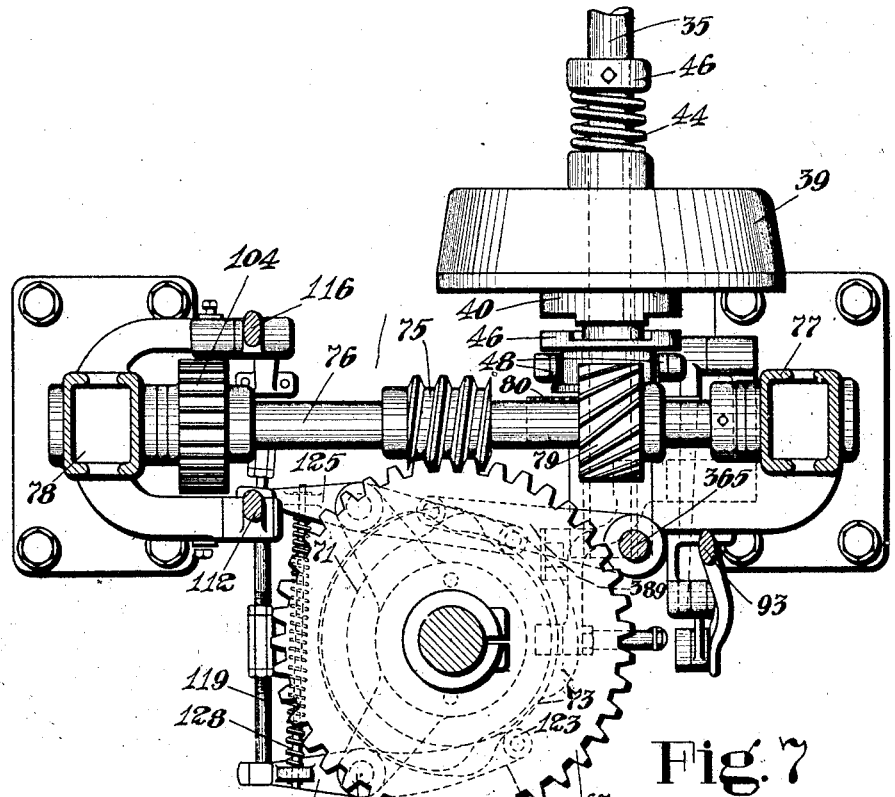
Fig. 7 is a similar section on the line 7—7 of Fig. 5.
Figure 6:
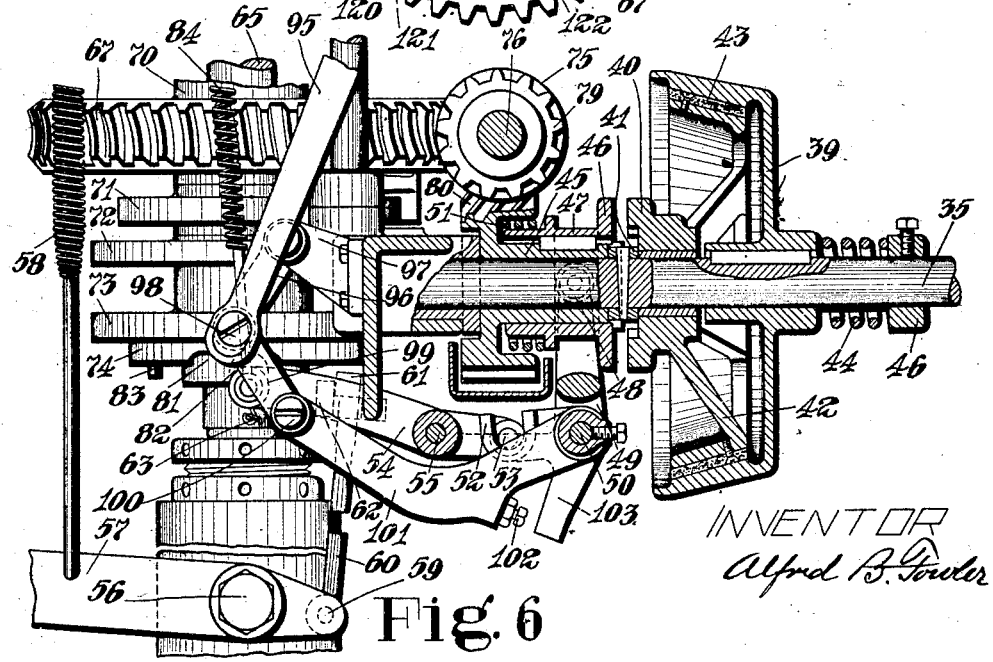
Fig. 6 is a section on the line 6—6 of Fig. 5, the parts being drawn on an enlarged scale.

The shaft 35, see Figs. 6 and 7, has splined thereto one member 39 of a clutch, the other member 40 of which is loosely mounted on the shaft. Secured to the shaft 35, Fig. 6, is a collar 41 against which the hub portion of the loose member 40 of the clutch bears. Extending from the loose member 40 of the clutch are the arms 42 carrying suitable friction material 43, and a spring 44 on the shaft 35 is interposed between a collar 46 secured to the shaft and the hub of the clutch member 39, the construction being such that the two clutch members will, under the stress of the spring 44, be normally held in operative relation and will therefore rotate together, but should any unusual obstruction occur to retard the member 40 of the clutch the two clutch members may yield or slip.

Loosely mounted on the shaft 35, Figs. 6 and 7, is a sleeve 45 on which is splined a clutch member 46 having a circular recess 47 engaged by pins or rolls 48 on the bifurcated end portions of an arm 49 pivoted at 50. The clutch member 46 is normally under the influence of a spring 51 tending to move the clutch member 46 into clutching engagement with the clutch member 40, said clutch members having complemental projecting and recessed portions for positive engagement, as indicated in Fig. 7.

The clutch controlling arm 49 has a recessed extension 52 which is engaged by a pin 53 mounted on a lever 54 pivoted at 55 to the main frame, the construction being such that should the lever 54 be turned clockwise, Fig. 6, the clutch member 46 will be moved to the left and be disengaged from the clutch member 40, but should the lever 54 be moved counter clockwise, Fig. 6, the pin 53 will rise and permit the spring 51 to cause the clutch members 46 and 40 to engage. The clutch member 46, as heretofore explained, is splined to the sleeve 45 and when the clutch members are operatively engaged the sleeve 45 will be turned. Trains of mechanism, as will more fully appear, are connected to the sleeve 45 and control the movements of the several parts of the machine.

Figure 5:
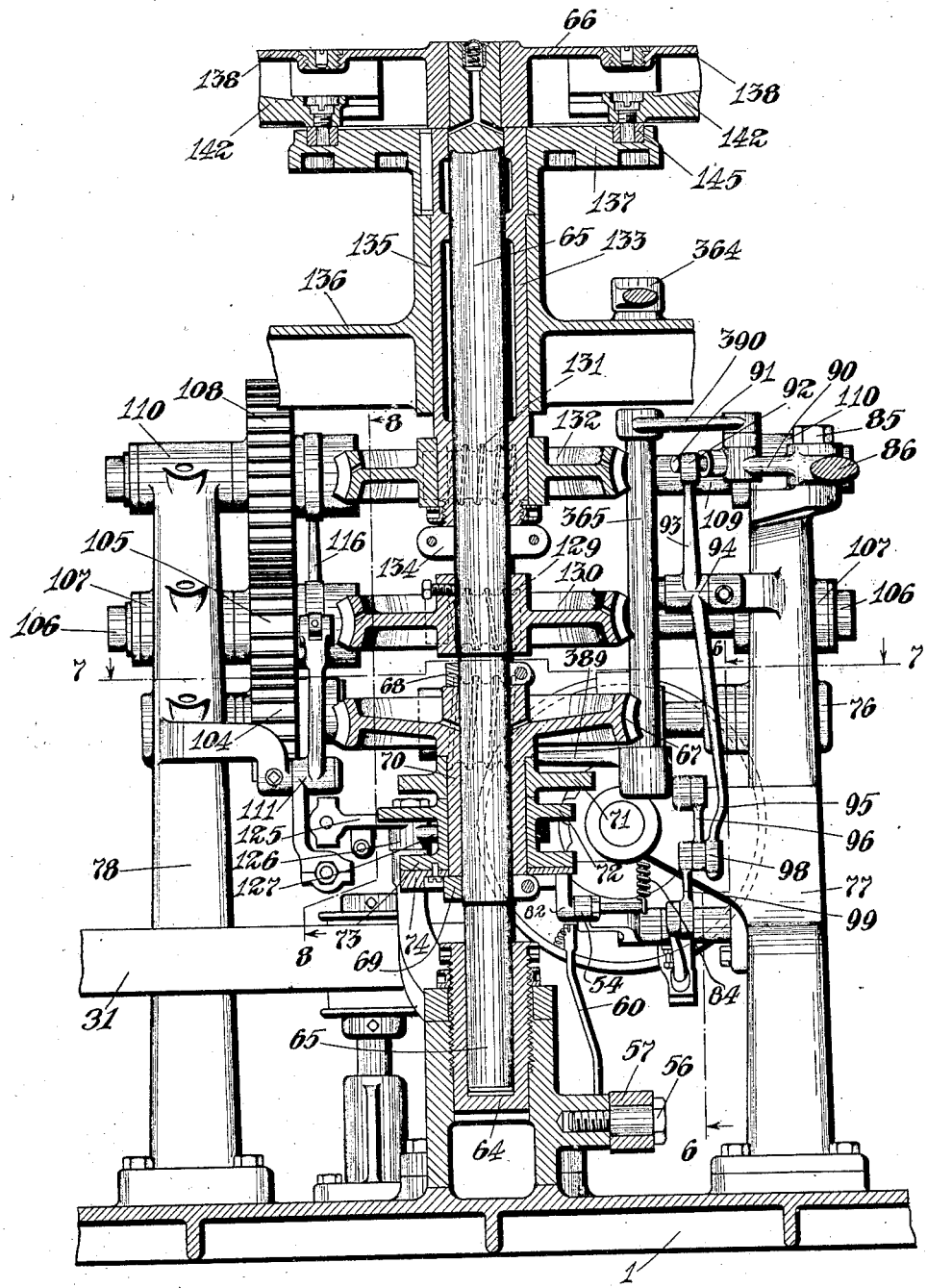
Fig. 5 is a transverse section showing more particularly the means for automatically controlling the table, the jack operating mechanism and the clutch.

Pivotally mounted at 56, Figs. 5 and 6, is a jacking treadle 57, the foot engaging end of which is normally held elevated by a spring 58, Fig. 6. Connected to the jacking treadle 57 at 59, Fig. 6, is a rod 60 the upper end portion of which carries a catch 61 adapted at times, as will presently appear, to engage a lug or projection 62 mounted on the clutch shifting lever 54. A spring 63 urges the upper end of rod 60 to the left (Fig. 6) and normally tends to engage the catch 61 with the lug 62, the construction being such that with the parts in position as indicated in Fig. 6 should the jacking treadle 57 be depressed the catch 61 will be lifted to carry its shoulder above the lug 62, whereupon the spring 33 will engage the catch with the shoulder, and upon release of the jacking treadle 57 the rod 60 will be pulled downward to thereby turn the lever 54 counter-clockwise and permit engagement of the clutch members 40 and 46.

Mounted in a suitable step bearing 64 on the machine base 1, Fig. 5, is the table spindle or shaft 65 to the upper end portion of which is secured the table or carrier 66, the characteristics of which will be hereinafter more fully described.

The spindle or shaft 65 has loosely mounted thereon the worm wheel 67, Figs. 5, 6 and 7, which is confined between suitable collars 68 and 69 secured to the spindle or shaft 65. The hub 70 of the worm wheel 67 is elongated as indicated in Figs. 5 and 6 and has secured thereto a series of cams 71, 72, 73 and 74 for controlling the operative or inoperative condition of certain parts as will more fully hereinafter appear.

The worm wheel 67 is operatively engaged by a worm 75, Figs. 6 and 7, secured to a transverse shaft 76 rotatably mounted in suitable bearings formed in the risers 77 and 78 projecting upwardly from the machine base, substantially as indicated in Fig. 5. The shaft 76 is driven from the clutch member 46 through an appropriate train of connecting mechanism which, as illustrated, may comprise a worm wheel 79, Figs. 6 and 7, operatively engaged with a worm 80 formed as part of or secured to the sleeve 45, the construction being such that when the clutch members 40 and 46 are engaged the worm wheel 67 and its connected hub 70 carrying the cams 71, 72, 73 and 74 will be continuously rotated.

When the clutch members 40 and 46 have been operatively engaged by counterclockwise movement of the lever 54 in the manner hereinbefore described, it is desirable that such lever be maintained in position with the clutch members engaged to maintain the series of cams 71, 72 and 73 in operative control of the table, the jacks or work supports thereon and the tools, as will more fully appear, until the tools have completed their respective operations upon the heels of the shoes presented thereto and a finished shoe has reached the jacking station, and that then the parts be controlled so as to prevent further operation until the finished shoe is removed and another jacked at the jacking station. To this end the hub 70, Fig. 6, carries the cam 74 which may be appropriately formed on the face of the cam 73 and which has a depressed portion 81. The lever 54 carries a projection or rider 82 over which the cam 74 travels, the construction being such that when the lever 54 is turned counter-clockwise in the manner hereinbefore described, and the cam 74 is turned through the means stated, the projection or rider 82 will travel along the face of the cam and hold the lever 54 in position with the machine in operation. Projecting from the face of the cam 74 is a pin 83, Fig. 6, which, as the cam 74 rotates is adapted to engage the catch 61 on the arm 60 and disengage the catch from the lug 62, so that after the projection or rider 82 has engaged the high part of the cam 74, the lever 54 is freed from control of the jacking lever 57 and will remain with the clutch members 40 and 46 in engaged relation until, in the rotation of the cam 74, the depressed portion 81 thereof comes opposite the projection or rider 82, whereupon the lever 54, under the impulse of a spring 84, Fig. 6, will be turned clockwise, Fig. 6, to disengage the clutch members 40 and 46 and stop operative movement of the machine.

In addition to the means described for controlling the engagement and disengagement of the clutch members 40 and 46, other means are provided in order to stop the machine at the will of the attendant, as will now be described.

Figure 4:
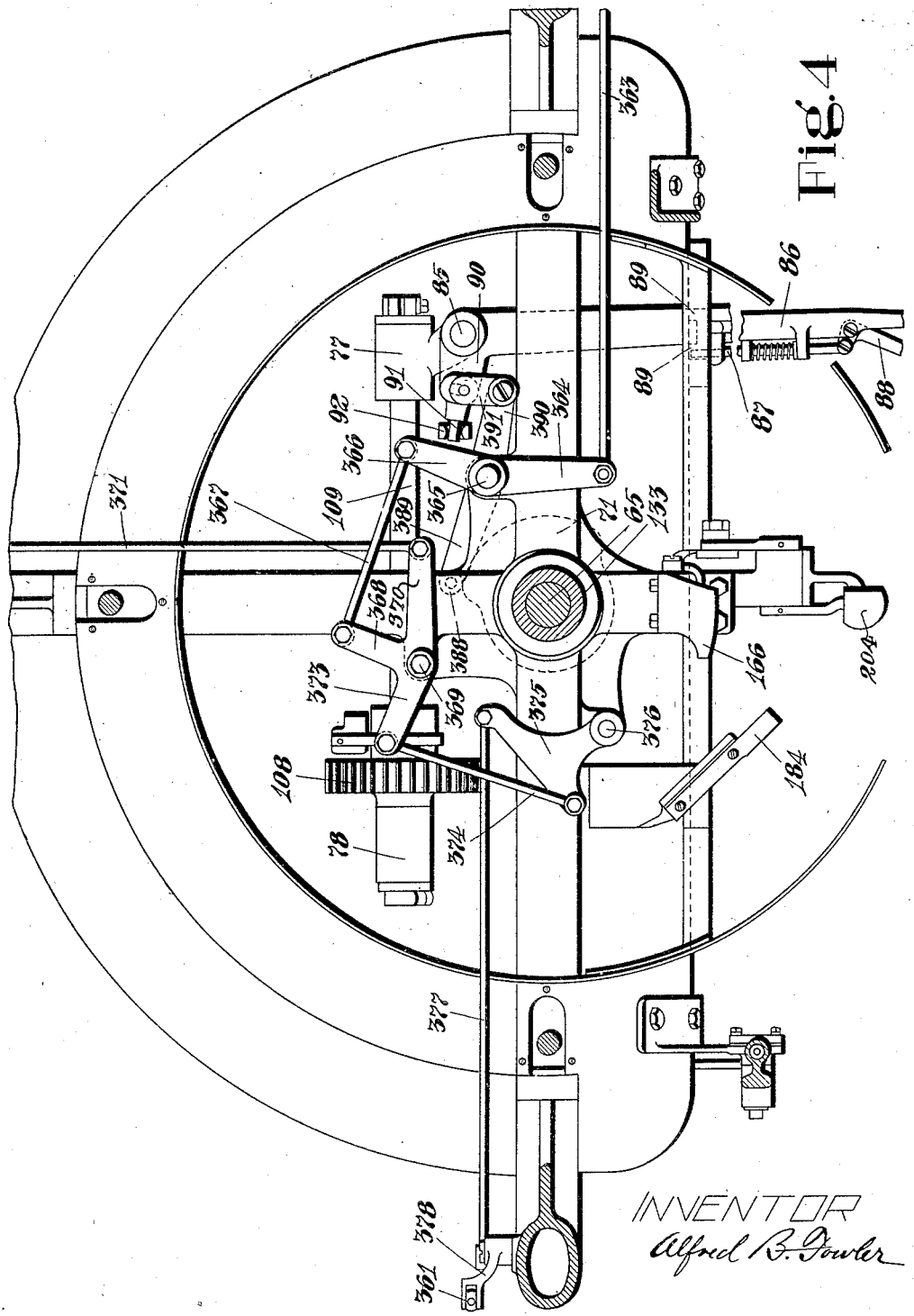
Fig. 4 is a horizontal section on the line 4—4 of Fig. 3.

Pivotally mounted at 85, Figs. 4 and 5, is an emergency lever 86 which extends to the front of the machine near the jacking station in convenient reach of the attendant. The emergency lever 86, as indicated in Fig. 4, has a locking pin 87 and a hand control grip 88 whereby the emergency lever may be moved about its pivot 85 and held in desired position by suitable locking recesses 89 formed in a portion of the machine frame as indicated in Fig. 4. The emergency lever 86 has a projecting arm 90, Figs. 4 and 5, which terminates in a pin 91 engaged with the bifurcated end 92 of a lever 93 pivoted at 94 on a bracket or lug secured to or formed as part of the riser 77.

The lever 93 has a downwardly projecting arm 95, Figs. 5 and 6, the lower end portion of which is connected to a toggle for controlling the clutch member 46. In the present instance of the invention the toggle comprises the link 96 pivoted to a bracket at 97 fixed to the machine frame and connected at its other end at 98 to the other toggle member 99, Figs. 5 and 6, the lower end 95 of the lever 93 having a slotted connection with the joint of the toggle at 98 as illustrated in Fig. 6. The link 99 of the toggle is connected at 100, Fig. 6, to the end of a lever 101 mounted for pivotal movement at 50 and carrying an adjustable pin 102 adapted, when the lever 101 is moved downwardly by straightening the toggle, to engage the end of a finger 103 projecting from the clutch shifting arm 49, the construction being such that should the emergency lever 86, Figs. 5 and 6, be turned to the right, Fig. 5, the lever 93 will be rocked to cause the lower end 95 thereof to straighten the toggle and disengage the clutch member 46 from the clutch 40, thereby stopping rotative movement of the sleeve 70 and the cams carried thereby and consequently suspending the operative movements of the table and jacks mounted thereon. Shifting movement of the emergency lever 86 has additional functions with respect to the movement of the tools from operative position when the emergency lever is actuated with jacked shoes in position for treatment by the tools and this characteristic of the invention will later appear.

The shaft 76, Figs. 5 and 7, has secured thereto a pinion 104 which is operatively engaged with a pinion 105, Fig. 5, loosely mounted on the shaft 106 appropriately journaled in bearings 107 sustained by the uprights or risers 77, 78. The pinion 105 meshes with a gear or pinion 108, Fig. 5, loosely mounted on the shaft 109 appropriately supported in bearings 110 sustained by the risers 77, 78. Each of the pinions or gears 105, 108, may be operatively connected to its shaft under control of the cams 72, 73 heretofore described as rotatable with the worm wheel 67.

In the illustrated machine the hub portions of the gears or pinions 105, 108 are adapted to be clutched to their respective shafts under the control of Horton clutches but, of course, other forms of clutches might be employed. Pivotally mounted at 111, Figs. 3, 5 and 8, is a lever 112 having an upwardly spring impelled member 1131 adapted to engage the shoulder 114 connected with the usual roll carrier or cage of a Horton clutch. Similarly there is pivoted at 115, Fig. 8, a lever 116 having a similarly supported spring member 1171 adapted to engage with a shoulder 118 connected to the cage of a Horton clutch, the construction being such that should either of the members 1131 or 1171 engage with the shoulder of the associated Horton clutch, such clutch will be rendered ineffective and the gear or pinion with which it is associated will be operatively disconnected from its shaft. The pins 113 and 117 carried by the members 1131 and 1171 may hold their respective shafts from rotation when in stopped position by entering suitable holes in the usual cam part of the clutches.

The lower end portion of the lever 112 is connected by an adjustable rod 119 with a lever 120, Figs. 3, 7 and 8, pivoted at 121, Fig. 3, and having an arm 122 carrying a roller 123 adapted to bear upon the peripheral portion of the cam 73. Similarly the lower end of the arm 116, Fig. 8, is connected by an adjustable rod 124, Fig. 8, with an arm 125 pivoted at 126 and having an arm 127, Fig. 5, the end of which carries a roller bearing against the peripheral portion of the cam 72. Between the arms 120 and 125, Fig. 8, is interposed a spring 128, Fig. 8, for normally pressing the free ends of the arms 120 and 125 away from each other and, consequently, the other ends of the arms carrying the rolls against their respective cams, the construction being such that under the dictates of the cams 72 and 73 the Horton clutches heretofore described will be appropriately operated to connect their respective gears or pinions 108 or 105 to the shafts 109 and 106 respectively. The pinions 105 and 108 are continuously driven by gear 104 when the table and jack operating clutch is closed, and the shaft 106 or 109 will be operated whenever its associated clutch is operatively connected to it.

The shaft 106 has secured thereto a worm 129 which is engaged with a worm wheel 130, Fig. 5, secured to the table spindle or shaft 65, the construction being such that when the gear or pinion 105 is clutched to its shaft as hereinbefore described, the table 66 will be appropriately rotated.

The shaft 109 has secured thereto a worm 131, Fig. 5, which is engaged with a worm wheel 132 secured to a sleeve 133 loosely mounted upon the table spindle or shaft 65 and supported vertically thereon by means of a collar 134. The upper end of the table spindle or shaft 65 and the sleeve 133 have suitable bearing 135 in the upper portion of the cross frame 136, Fig. 5. Secured to the upper end of the sleeve 133, Fig. 5, is a jack controlling cam 137.

The table or carrier for carrying the shoe supports or jacks, of which there may be any suitable number, may be variously contrived and secured to the table spindle or shaft 65, but in the illustrated embodiment of the invention the table comprises the four arms 138 (Fig. 2) each of which carries a shoe support or jack. The space between the arms 138 may be appropriately covered as by suitable plates 139, Fig. 2, to prevent chips and other foreign matter from finding their way into the working parts of the machine beneath.

Mounted in each of the arms 138 is a slide block 140, Figs. 10 and 12, each block 140 being mounted for sliding movement on its arm 138 in suitable ways or guides 141. Extending inwardly from each of the blocks 140 is an arm 142, the inner end of which has sliding engagement with a guide 143, Fig. 10, the construction being such that as the slide block 140 and arm 142 are moved radially of the table or arms 138 they will be suitably guided.

The jack controlling cam 137, which, as hereinbefore described is secured to the sleeve 133, is provided with two cam surfaces or grooves one for controlling the inward and outward movement of the jacks relative to the table and the other for controlling the rotative movement of the jacks and shoes thereon during the operation of the tool or tools upon the heel, the two cams acting conjointly during the heel treating operation by one of the tools to traverse the heels past the tool at appropriately varying speeds so that the tool shall treat equal areas of the surface of the heel during equal units of time.

To effect the inward and outward movement of the jacks the cam 137 is provided with an upper cam groove 144, Figs. 10 and 12, which is engaged by a roll or pin 145 extending from the arm 142 on the slide block.

Mounted for rotative movement in the slide block 140 is the jack support 146, Fig. 10, to which is secured or splined a pinion 147, through the medium of which the jack, to be hereinafter described, is appropriately rotated. Mounted in the arm 142 of the slide block is a pin or support 148, Fig. 10, provided with a collar 149 between which and the arm 142 is a toothed segment 150, the teeth of which engage the teeth of the pinion 147. When the jacked shoe is operatively positioned relatively to a tool, the present invention contemplates movement of the jack to present to the tool in each unit of time a like extent of contour surface for treatment. But when the treated shoe reaches jacking position it is desirable that the jack shall be freed from its rotating means in order that the attendant may properly accommodate the shoe to the jack.

To these ends the pin 148 extends below the collar 149 at 151, Fig. 10, and is provided with a sleeve 152, a spring 153 being interposed between the sleeve 152 and a stop or nut 154, the construction being such that the spring 153 normally tends to lift the sleeve 152 on the pin extension 151. The sleeve 152 at its upper portion is provided with a locking pin 155, Fig. 11, which is adapted to engage a recess 156, Fig. 12, formed in the toothed segment 150 and, accordingly, lock the toothed segment to the sleeve 152, when the two are brought into registering relation.

Each sleeve 152 is connected by a link 157, Fig. 10, with an arm 158 pivotally mounted at 159, Fig. 3, on a lug extended from the corresponding table arm 138. Each of the arms 158, of which there is one for each jack, has a roll 160, Figs. 10 and 12, adapted to engage one of a series of appropriate cam tracks or grooves 161 formed in the under surface of the cam 137, the construction being such that when the cam and table are relatively moved and the sleeve 152 is locked to the segment 150, a condition which obtains when the jack is in operative relation to the tool, the jack is suitably rotated as hereinbefore described.

Figure 1:
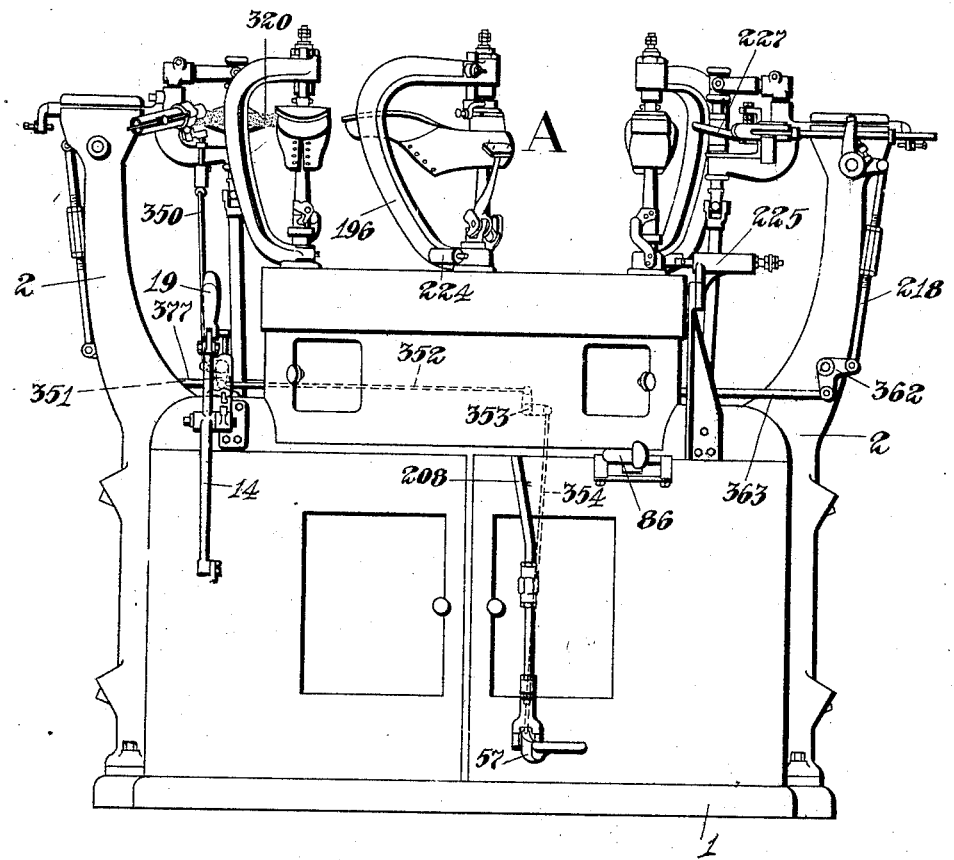
Fig. 1 is a front elevation of a machine embodying the features of the present invention.

When a jack carrying a shoe the heel of which has been treated by the tool reaches jacking position at the front of the machine, as indicated at A Fig. 1, it is desirable that the jack be released from its rotating means and be moved to a convenient position for the removal of the treated shoe and the reception of a shoe to be treated. To this end a spring 162, Figs. 10 and 12, is connected to the toothed segment 150 so that when free to respond to the spring, the toothed segment may be rotated to turn the jack into an appropriate position for the removal of a jacked shoe and the reception of a shoe to be jacked.

Pivotally mounted at 163 are the arms 164, Fig. 10, of a bifurcated lever carrying at its end a roll 165, adapted, as the jacked shoe approaches jacking position as indicated at A, Fig. 1, to engage the inclined surface of a cam 166, Figs. 4 and 10, the effect being that as the jack approaches jacking position the roll 165 on the bifurcated lever will be depressed. The arms 164 of the bifurcated lever, as indicated in Fig. 10, are each provided with a pin or roller 167 which engages a circular recess 168 in the sleeve 152, the construction being such that when the jack is approaching jacking position the end of the bifurcated lever will be depressed and the locking pin 155 carried by the sleeve 152 will be withdrawn from the recess 156 in the toothed segment 150, whereupon the spring 162 will turn the jack into an appropriate position for the convenient removal and reception of shoes, and even though the cam 137 be thereafter rotated during jacking operation, the jack will not partake of the rotary movement and may be conveniently manipulated by the attendant.

Mounted for vertical movement in the jack block 146 is the jack spindle 169, Fig. 10, the lower end portion of which rests upon a ball 170 interposed between the spindle 169 and a jacking plunger 171, the construction being such that upon upward movement of the plunger 171 the jack spindle 169 will be raised. In order to hold the jack spindle in its raised or jacked position, the present invention contemplates means permitting such upward movement of the jack spindle and for holding it in jacked position. To this end the jack slide 140 has connected thereto the cap piece 173 in which is mounted the hardened steel block 174 through which passes the jacking plunger 171. The jacking plunger 171 has a flattened face as at 175, Fig. 10, adapted to be engaged by a locking roller 176 which rides along the inclined surface 177 of the block 174, Fig. 10, and under the impulse of a spring 178 seats itself at the contracted portion of the space between the block and the flattened face 175 of the plunger to maintain the latter and, therefore, the jack spindle, in the raised or jacked position.

When a jack with a treated shoe thereon approaches jacking position as indicated at A, Fig. 1, it is not only desirable to have the jack free for attendant control rotatably as hereinbefore described, but the shoe should be unjacked. To this end the present invention contemplates the provision of means for automatically unjacking the shoe as the jack approaches jacking position. The steel block, 174, heretofore described as contained within the cap piece 173, has lugs 179 projecting therefrom in which is mounted a pin 180, Fig. 10. Pivoted on the pin 180 is a rocking lever 181, Fig. 10, having a toe portion 182, adapted to engage beneath the locking roller 176. Mounted on the rocking lever 181 is a roller 183, Fig. 10, which as the jack approaches the jacking station as indicated at A, Fig. 1, with a jacked shoe thereon, is adapted to engage a cam 184, Fig. 4, secured to the frame of the machine in the path of movement of the roll 183, the construction being such that as the jack approaches the jacking station the lever 181 will be actuated to unlock the jacking plunger 171 and permit the jack spindle to drop.

Figure 13:
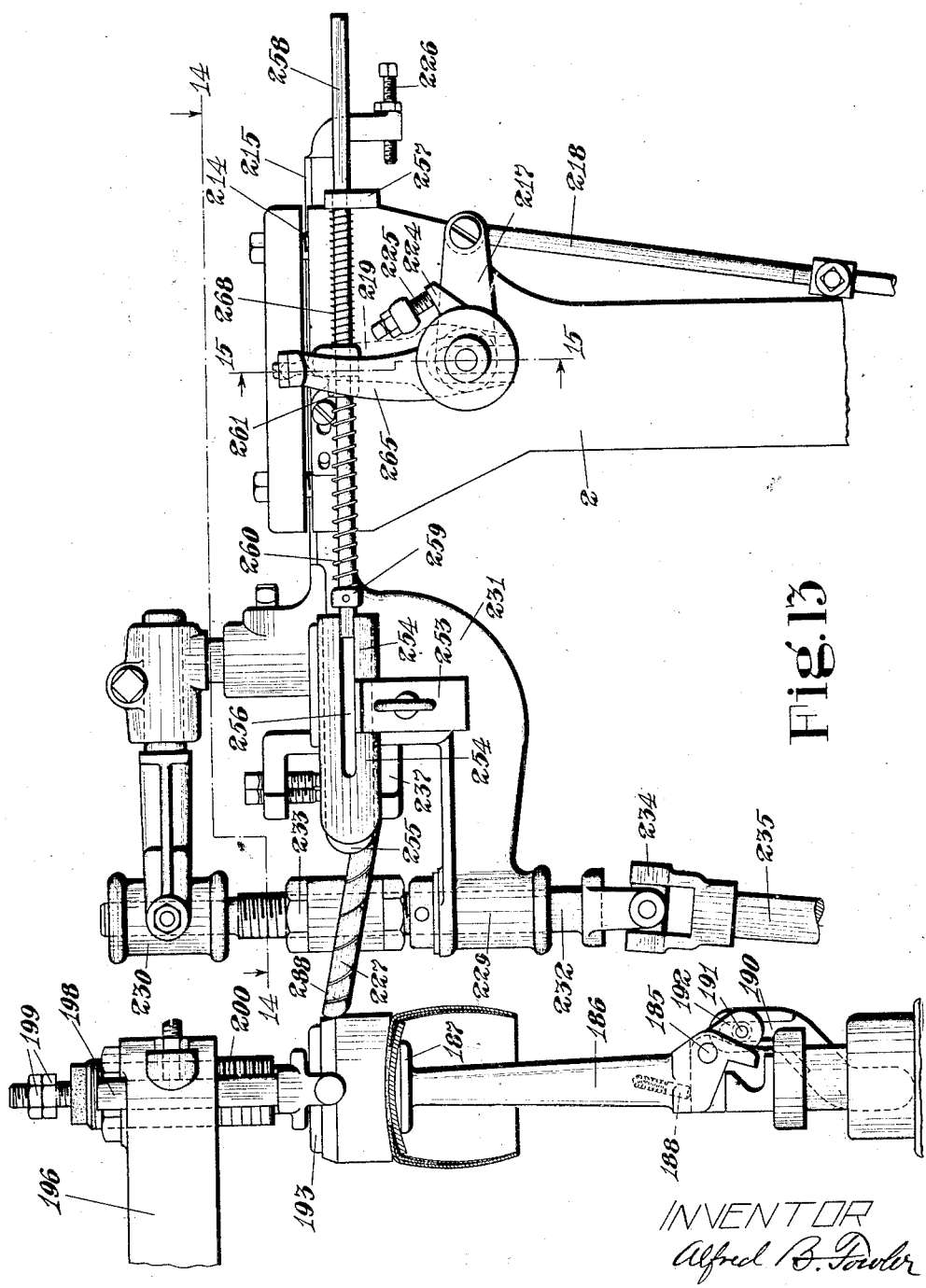
Fig. 13 is a side elevation of the burnishing tool and parts of its operating mechanism, showing also in cross section a jacked shoe in position to be operated upon by the tool.

When the jacked shoe reaches the jacking station it should not only be unjacked for convenient removal but should be placed in convenient position for such removal and the jack parts arranged for convenient reception of another shoe. Pivotally mounted at 185, Figs. 10 and 13, is a jack 186 provided at its upper end with a suitable shoe engaging portion 187. Contained in an aperture at the base of the jack is a spring-pressed plunger 188, Fig. 13, engaging the upper surface of the head of the spindle 169, the construction being such that when the jack is free to swing into the position indicated in Fig. 10, the spring plunger 188 will move the jack to that position. It is necessary, however, that when the jack is turned into vertical position to jack the shoe it should be securely held in such position, and, later on, released when the jacking plunger is unlocked to permit the dropping of the jack. To accomplish this there may be rigidly attached to each jack support 146, through which passes the spindle 169, a projecting finger 189 provided with a cam groove 190 with which engages a roll 191 journaled in a projection 192 extending from the lower end of the jack. The cam groove 190 is of such a form that as the jack is elevated to the position it occupies during the heel finishing operations, the roll is moved to swing the jack about its pivot 185 into upright position. On the other hand, as the jack is lowered at the jacking and unjacking station, the cam groove 190 guides the roll into position to permit the jack to swing under the influence of plunger 188 into convenient unjacking and jacking position.

Co-operating with the head 187 of each jack 186 to hold the shoes in the desired position thereon is a toplift engaging plate 193 having a sliding connection as indicated at 194 (Fig. 20) with the head of a plunger 195 spring pressed downwardly and adjustable by means of a threaded sleeve 200, as indicated in Fig. 18, in the upper extremity of arm 196 (Fig. 1). To limit the movement of the toplift plate 193 in the direction of the toe portion of the shoe there is provided an adjusting screw 197 (Fig. 17) mounted at the lower end of a rod 198 vertically adjustable in accordance with the position of the toplift plate. The upper end of plunger 195 is screw threaded and provided with a pair of adjustable nuts 199 to limit the downward movement thereof under the action of the spring. The position of sleeve 200 in which the plunger slides may be adjusted on account of its screw threaded connection to the end of arm 196 and it may be locked in adjusted position by any suitable means, indicated in the drawing as a lock nut. It will thus be seen that plunger 195, is, in the absence of a shoe on the jack, moved downward by its spring, this movement being limited, however, by nuts 199. The heel of a jacked shoe engages the toplift plate 193, the movement of the jack upwards into jacked position elevating the toplift plate 193 and the plunger 195 against the compression of the spring with the result that the shoe is firmly held in place.

Secured to the machine frame at the jacking station, as indicated in Fig. 10, is a bracket 201 having a sleeve 202 in which is a plunger 203 having a head 204 adapted to engage the lower end of the jacking plunger 171 when the jack is in jacking position. The plunger 203 has a suitable recess to engage the head 205 of a jacking lever 206, Fig. 10, pivotally mounted at 207 on the machine frame and connected by the rod 208 with the jacking treadle 57 (Fig. 1) hereinbefore described, the construction being such that by the depression of the jacking treadle 57 a shoe mounted upon a jack in jacking position may be suitably jacked.

As hereinbefore described, the act of jacking a shoe at the jacking station and the release of the jacking means or treadle 57 act to start the machine into operation, and when a shoe has been transferred from the jacking station to a tool and has been treated by such tool, the machine automatically comes to rest by movement of the projection 82 of the lever 54 upwardly into the recess 81 of the cam 74, Fig. 6. At this time the catch 61 on the arm 60 is disengaged from the lug 62, having been so disengaged by the pin 83 as before described, consequently, the clutch members 40 and 46 being now out of engagement, the table movement, as well as the movement of the jacks relative to the tools as they treat the contour surfaces of the heels, will be suspended until after the jacking operation is again performed and the jacking means or treadle 57 has been released. This is desirable because until a shoe is properly jacked at the jacking station it cannot be properly presented to the tool or tools, and if the jack at the jacking station were moved from jacking position by the table before a shoe was properly jacked, the jack would be removed from the jacking instrumentalities and subsequent jacking of the shoe would be impossible. Consequently the initiation of the table and jack movement to carry the jacked shoes to the tools and for moving them relative to the tools during the tool operations, are made dependent upon the operation of the jacking means and the completion of the jacking to thereby insure that before these operations are inaugurated a shoe to be treated will have been properly jacked.

It will therefore be apparent that after a shoe has been jacked and the machine has been started to carry the jacked shoe by movement of the table from jacking position to the tool for treating the shoe, it is important to prevent further manipulation of the jacking means until another jack has reached the jacking station and the shoes presented to the tools shall have been treated. The jacking lever 206, Fig. 10, is provided with a catch or toe 209 which is adapted to engage the shoulder 210 of a latch 211 pivotally mounted at 212, as best indicated in Fig. 10, and normally under the influence of a spring tending to hold the shoulder in position beneath the toe 209. The latch 211 is also provided with an arm 213 having an end portion 214 adapted, as a jack approaches a jacking station, to be engaged by the roller 165 which moves with the jack to thereby swing the latch 211 from locking engagement with the jacking lever 206 and free the jacking mechanism for the jacking operation.

When the jack is in jacking position as hereinbefore explained, the toothed segment 150 is operatively disengaged from the actuating means 152 and pin 155 so that the jack may be manipulated by the attendant in jacking the shoe. As the jacked shoe, however, approaches the first tool for treatment after being jacked, it is desirable to have the tool commence its action and that the jack be placed under control of its rotating means, and to this end the jack support 146 is provided with a lug 224, Figs. 1, 2 and 10, which, as the jack approaches the first tool of the series, is adapted to engage a stop 225 as indicated in Fig. 2, the construction being such that as the table carries the jacked shoe from the jacking station at A, Figs. 1 and 2, to the first of the series of tools for treatment, the lug 224 of the jack will engage the stop 225 and the jack will be turned against the tension of its spring 162, Fig. 10, to bring the opening 156 in the toothed segment 150 into register with the pin 155 carried by the sleeve 152 as hereinbefore described, thereby placing the jack automatically under the control of its rotating means.

In the disclosed embodiment of the invention the first tool to which the heel contour is presented for treatment is a burnishing tool which is mounted for movement towards and from the work. The second tool of the series, as disclosed in the present embodiment of the invention, is a beading tool, while the third tool of the series is a polishing brush. Obviously, as to some of the features of the invention the character of the tool or tools may be varied to suit the character of the work to be performed. In the present instance where burnishing, beading and polishing tools are employed it is desirable to provide means for moving the tools toward and from the heel of the shoe as the finishing operation is commenced and finished. The means for producing this motion will be described in connection with the burnishing tool with the understanding that the same applies also to the other tools except where specific differences are pointed out or are apparent.

At the upper end of the standard 2 (Figs. 13 and 15) is provided a guideway 214 in which is mounted for reciprocating movement a slide 215 which may advantageously be supported by anti-friction rolls $216^x$. Journaled in the standard 2 beneath the guideway 214 is a rockshaft 216 connected to which, as by a Horton clutch similar to that of Fig. 8 and provided with a dog 224, is a rock arm 217 pivoted at its outer end to a rod 218. Engaging a flattened portion of shaft 216 by means of a bifurcated portion at its lower end and constructed to be rocked thereby is a lever 219 pivotally connected at 220 to slide 215. Fastened at 221 to the shaft 216 is a spring 222, the other end of which is anchored as shown at 223, Fig. 17, to standard 2. Spring 222 is under tension tending to rotate shaft 216 in a direction to rock lever 219 so as to move slide 215 and the burnishing tool supported thereby toward the heel of a shoe jacked as shown in Fig. 13 to perform the burnishing operation. Movement of the carrier of the Horton clutch in this direction is limited by contact of the dog 224 thereof with an adjustable stop 225 on the standard 2. When arm 217 is rocked in the other direction, however, the clutch which is then operative, withdraws the slide always the same distance from the work.

The slide 215 is preferably provided with an adjustable stop 226 to engage the upper end of the standard 2 to limit the forward movement of the slide.

At its forward end the slide 215 carries the burnishing, beading or polishing tool, as the case may be. The burnishing tool 227 of the illustrated machine, as clearly shown in Figs. 13 and 14, is preferably provided with a working face narrower than the height of the heel to be treated and is of such a form that, though actually elliptical, it appears in plan view as a circle, the tool being thereby adapted to operate upon heels having a vertical contour surface. The form of the burnishing tool may be varied in accordance with the shape of the heel to be operated upon. It may preferably be provided with a series of diagonal grooves 228 for the purpose of taking up and holding wax, as will be hereinafter more fully described. Journaled in bearings 229, 230 in a bracket 231 supported at the forward end of the slide 215 is a shaft 232 on which the burnishing tool is adjustably mounted as indicated at 233. The shaft 232 is connected at 234 by a universal connection to a shaft 235 preferably composed of telescopic sections connected at 236 by a second universal connection to shaft 23 shown in Fig. 3. It will thus be apparent that the burnishing tool 227 will be continuously operated during the running of the machine.

To heat the burnishing tool there may be provided a friction block 237, see Fig. 14, mounted on a plunger 238 adjustable in a sleeve 239 supported by bracket 231. Plunger 238 as shown in Fig. 14 is urged forward by spring 249 into contact with the burnishing tool. To hold the friction block out of such contact, the plunger 238 has pivoted thereto a cam member 250 provided with an operating handle 251 and engaging against a lug 252 on the sleeve 239. It will thus be apparent that the friction block 237 may be released for forward movement by rotation of cam 250 controlled by handle 251 to allow the spring 249 to press the block 237 against the burnishing tool.

Supported by bracket 231 as at 253 is a guide or tube 254 for holding a stick of wax 255 to present the same to the burnishing tool. Tube 254 is slotted at 256. Supported as at 257 for longitudinal sliding movement is a thrust rod 258 provided at its forward end with a suitable wax engaging portion entering tube 254 through slot 256 and serving to control the stick of wax. Rigid with the rod 258 is a collar 259 forming a bearing for the forward end of spring 260, the rear end of which bears against collar 261, adjustably supported by standard 2. Collar 261 contacts with a clip 262 in which is journaled at 263 a clutch member 264 having a rod engaging portion eccentric with respect to its axis of rotation as indicated in Fig. 16. Mounted on shaft 216 to rock therewith is an arm 265 provided at its upper end with a plate 266 having a slot or aperture to receive the upper end 267 of clutch member 264. The clutch member 264 is of such form that when rotated in a clockwise direction as viewed in Figs. 13 and 16, it firmly grips rod 258 whereas when rotated in the opposite direction the rod is released. Thus when under the action of rod 218, moving upwardly, shaft 216 is resiliently rocked in a counterclockwise direction as viewed in Fig. 13 to permit the burnishing tool to move forward into heel finishing position under the influence of spring 222, rod 258 is released from the restraint of clutch member 264 and under the action of spring 260 is impelled forwardly, pushing the stick of wax into contact with the burnishing tool, the grooves 228 of which pick up wax and apply the same to the heel during the burnishing operation. On the other hand, when shaft 216 is rotated by rod 218 in a clockwise direction as viewed in Fig. 13 to withdraw the burnishing tool from the heel, clutch member 264 is moved in a clockwise direction as viewed in Fig. 16 and grips rod 258, the continued rotation of arm 265 with shaft 216 withdrawing rod 258, since the lever arm 265 is longer than lever 219, and permitting the stick of wax to rebound in its tube from the burnishing tool. Tending to maintain member 262 in contact with collar 261 supported by standard 2 there is shown a spring 268.

The beading tool 275 (see Figs. 17 and 18) is supported in a bracket 276 movable into and out of operative position in substantially the same manner as the burnishing tool. It is, however, instead of being merely adjustable upon its shaft 277, mounted for floating or counterbalanced movement thereon as by a suitable spring, Fig. 18. Shaft 277 is driven from shaft 33 through suitable universal connections in a manner similar to that described with relation to the burnishing tool. Pivoted to bracket 276 remote from shaft 277 is a lever 278, supported also by an adjustable stop 279 carried by bracket 276. Near its forward end this lever is provided with a slideway 280 in which is mounted for approximately horizontal sliding a feeler member 281 having its forward end curved and of such a form as to ride up over the curved surface of the upper of an inverted shoe and enter the rand crease thereof as bracket 276 and the mechanism supported thereby are moved forward into heel finishing position. The feeler member 281 is urged forward with respect to lever 278 by means of a light spring 282 which yields as the feeler during the forward movement of bracket 276, engages the upper of the shoe, to prevent damage of the shoe thereby. The feeler member may be provided with a guide groove engaging a projection 283 at the end of lever 278 and is connected for floating movement with the beading tool as by means of a pin 284. As shown in Fig. 18, the end of feeler member 281 is at the same level with and adjacent to a circular flange 285 on the beading tool, the flange being adapted to enter the rand crease of the shoe and finish the chamfered edge of the sole thereof and of course performing also in co-operation with feeler 281 the function of properly locating the beading portion 286 of the tool with respect to the heel to be operated upon.

A friction member 274 is shown in Fig. 18 for the purpose of heating the beading tool 275 through its rubbing action on shaft 277.

It sometimes happens that the beveled end of the welt adjacent to the heel of a shoe becomes slightly separated from the rand with the result that there is occasional possibility of the rand-crease-entering flange of the burnishing tool being deflected from its desired course, which should be in engagement with the surface of the welt remote from the rand and the sole, towards the end of the beading operation with resulting marring of the rand or the edge of the sole by the flange of the tool. To avoid this, there is provided a member illustrated as a finger 290, Figs. 17 and 19, pivoted at 291 to a sleeve 292 serving as a support and mounted for rocking movement on shaft 277. The finger 290 has a wedge-shaped end 293 adapted when brought into contact with the shoe to slide over the curve of the upper into engagement with the beveled end of the welt and press the same firmly against the rand to insure the passing of the flange of the beading tool in the desired relation to the welt. This finger, which is curved concentrically with the axis of the supporting sleeve 292, is controlled to be brought into operation only as the beading tool approaches the corner of the heel breast near the end of its operation. To accomplish this, sleeve 292 and the finger 290 supported thereby are normally held with the end of the finger in the position indicated by the dotted line at 294 in Fig. 19, by means of rod 295. This rod is supported for horizontal movement by a bracket 296, Fig. 17, and is provided at its forward end with a slot 297 engaging a pin 298 mounted in sleeve 292. Pivoted at 299 to a bracket carried by standard 2, Figs. 17 and 18, is a bell crank lever 300 constructed to be rocked by the rod 301. The other arm of the bell crank lever is provided with a pair of adjusting screws 302 engaging between them the end 303 of a clutch member 304, similar to that of Fig. 16, engaging the rod 295 in such manner as to grip the rod and move it rearwardly as bell crank lever 300 is rocked in a counterclockwise direction as viewed in Fig. 17, but to release the rod when the bell crank lever is rocked in the opposite direction. To hold the clip 305 of this clutch member in contact with bracket 296 there is provided a light spring 306.

When clutch member 304 is released, as it is at the time of the movement of the beading tool heel finishing position, the tension of spring 307 attached to rod 295 as at 308 and to a member 309 rigidly supported by the beading tool carrying bracket 231 tends to move rod 295 towards the jack. This movement, however, is restrained until the appropriate instant by means of a second clutch member 310, Fig. 17, normally held in position to grip the rod and prevent its forward movement, as by means of a spring 311. The clip of this clutch member is provided with an upwardly extending arm 312 positioned in the path of movement of a rod 316 mounted to slide in member 309 and normally held out of contact with arm 312 by a spring 317 connected at one end to collar 318, which is secured to rod 316, and at its other end to the forward portion of member 309. The end of rod 316 remote from arm 312 is so located that it is out of the way of the jacked shoe as the same is rotated during the beading operation until that operation is nearly completed at which time rod 316 is engaged by the shoe and pushed rearwardly against the tension of spring 317 to rock arm 312 and release rod 308 from the action of clutch 310. As at the start of the beading operation clutch 304 was released, rod 295 is now free to move forward under the influence of spring 307 with the result that the wedge-shaped end 293 of finger 290 moves forward into the rand crease of the shoe and holds the beveled end of the welt firmly in place so that the flange of the beading tool passes therebelow.

When the bracket 231 of the beading tool is withdrawn in the subsequent action of the machine, the bell crank lever 300 is rocked in a counterclockwise direction as viewed in Fig. 17 and withdraws rod 295 against the action of spring 317. At the same time, the shoe having moved along, rod 316 is pulled forward by spring 317 so that clutch member 310 is in condition also to restrain forward movement of rod 295.

The polishing brush 320 (Fig. 20) is mounted for rotation by a shaft 321 connected through a shaft 322 to shaft 28 by means of suitable universal joints, shaft 322 as well as the corresponding shafts for the other operating tools consisting of telescoping members as indicated at 323, Fig. 3, to permit the necessary variation in the length thereof as the tools are moved from one position to another. Shaft 321 is mounted in a bracket 231 similar to that of the burnishing tool supported at the upper end of a standard 2 and moved into and out of heel finishing position by mechanism similar to that described in connection with the burnishing tool. Brush 320 may be adjusted to the desired position on its shaft by means of nuts 324 engaging a threaded portion of the shaft. Pivoted to the bracket 231 is a member 335 carrying, as by means of a screw and slot connection 336, a sleeve 337 bearing a slotted wax stick holding tube 338. Attached to sleeve 337 is a rod 339 on which is slidably mounted a follower 340 arranged to be clamped to the rod 339 by a set screw 341 for the purpose of engaging the end of the stick of wax and holding the same in position. Supported by bracket 231 is a bracket 342 provided with a sleeve 343 in which is slidably mounted a plunger 344 normally held in the elevated position indicated in Fig. 20 by means of a spring 345 engaging a collar 346 mounted thereon. Attached to member 335 and to the sleeve 343 is a spring 347 of insufficient strength to depress plunger 344 against spring 345. When, however, plunger 344 is depressed by means hereinafter described, spring 347 rocks member 335 about its pivot and thus brings the stick of wax held in 338 into contact with brush 320. Since it is desirable to apply only a very small quantity of wax to the brush 320, mechanism is arranged to hold the stick of wax in contact with the brush only during the short time that the treadle 57 is in depressed position. For this purpose, plunger 344 is connected at its lower end with a rod 350, Figs. 1 and 20, connected at its lower end to one arm of a bell crank lever 351, the other arm of which is pivoted to a rod 352, the other end of which is attached to an arm of bell crank lever 353. The other arm of this last is connected to rod 354 attached to treadle 57. Thus it will be seen that the depression of treadle 57 operates to bring the wax into contact with brush 320 and upon release of the treadle, which in practice takes place a very short interval of time after its depression, the wax moves back out of contact with the brush.

The means for controlling movement of rod 218 of the burnishing tool mechanism and the corresponding rods 360 and 361 of the beading tool and brushing mechanism respectively to bring the tools into and out of operative relation to the work will now be described. Rod 218 is connected at its lower end to one arm of a bell crank lever 362 pivoted on a standard 2 of the main frame and having its other arm connected to a rod 363, Figs. 1, 3 and 4. The other end of rod 363 is connected to a lever 364 mounted on rockshaft 365. Rigid with rockshaft 365 is an arm 366 to the end of which is pivoted a rod 367, pivoted at its other end to one arm 368 of a three-armed lever pivoted at 369 to a convenient support on the main frame. Another arm 370 of the three-armed lever is connected by rod 371 with one arm of the three-armed lever 372 (Fig. 18) pivoted on the standard 2 which supports the beading tool. The other arms of lever 372 are connected to rods 301 and 360 respectively which control the operation of the beading tool and its associated members. The third arm 373 of the three-arm lever pivoted at 369 to the main frame is connected through a rod 374 (see Fig. 4) to a lever 375 pivoted at 376 to the main frame and connected by means of a rod 377 with one arm of a bell crank lever 378, the other arm of which is pivoted to rod 361 of the brush mechanism. It will thus be seen that movement of rockshaft 365 operates to move synchronously the different finishing tools into and out of heel finishing position. This movement of rockshaft 365 is produced and controlled by the action of cam 71 (Figs. 3, 4 and 5) against roll 388 mounted at one end of arm 389 rigidly connected to the rockshaft 365.

In order to withdraw the heel finishing tools from their operative position in case it is necessary to stop the action of the machine by emergency lever 86, arm 390, rigid with rockshaft 365, Figs. 4 and 5, is connected by means of link 391 to emergency lever 86 through a pin and slot connection such as to allow relative movement of link 391 and lever 86 during the normal operation of the machine, but to provide nevertheless that upon movement of lever 86 to stop the machine link 391 shall rock shaft 365 to move the burnishing tools back out of heel finishing position.

At the time each jack with its jacked shoe leaves the jacking station A (Figs. 1 and 2), it will be noted that as mentioned before the toothed segment 150 (Figs. 3, 10 and 12) is disengaged from sleeve 152. Appropriate means is accordingly provided to rotate the jack together with arm 196 in order to swing the gear segment into position in which it is locked to sleeve 152 by pin 155. This conveniently consists of a lug or projection 224 (Figs. 1 and 10) formed on each arm 196 and positioned to contact with a stop 225 adjacent to the burnishing tool as shown in Figs. 1 and 2. When lug 224 engages stop 225 the rotation of the table of the machine results in the swinging of arm 196 and the jack into such position that pin 155 enters aperture 156 of the gear segment with the result that sleeve 152 and the gear segment are locked in operative relation.

To use the machine, the operator, standing opposite the jacking station A, places a shoe or heel upon the jack 186 and depressing the treadle raises the work into firm engagement with the plate 193 in such a position that the breast of the heel engages the depending lip 195ª (Fig. 18) and is positioned on the jack thereby. As the work is pressed against the plate 193 by the action of the treadle, the spring surrounding the plunger 195 is compressed so as firmly to hold the work in position, and the spindle will be locked, in the position assumed, by means of the clutch roller 176.

In depressing the jacking treadle 57, the catch 61 will have been raised and pulled by the spring 63 into position above the projection 62 of the clutch shifting lever 54. When, therefore, the treadle is released and is raised by the spring 58, the downward movement of the rear end of the treadle lever will turn the lever 54 (Fig. 6) counter-clockwise and permit engagement of the clutch members 40 and 46. This will cause the rotation of the worm gear 67 with the cams 71, 72, 73 and 74 connected thereto and at the same time the rotation of the gears 104, 105 and 108. By the action of the Horton clutches under the control of the cams 72 and 73, first the gear 105 and then the gear 108 will be connected to its respective shaft so as to rotate first the spindle 65 carrying the table 66 and then the sleeve 133 carrying the jack-controlling cam 137. This will cause the table to rotate through approximately ninety degrees to bring the piece of work just positioned upon a jack into position opposite the burnishing tool, and it should be noted that, during the rotation of the table from jacking position A to the first work station, the lug 224 (Figs. 1, 2 and 10) will engage the stop 225, as indicated in Fig. 2, to the end that the jack will be turned against the tension of its spring 162 (Fig. 10) to bring the opening in the toothed segment 150 into register with the pin 155 carried by the sleeve 152, thereby placing the jack automatically under the control of its rotating means. At this time the toe of the shoe will point in a clockwise direction, looking down on the top of the machine, so that the burnishing tool will be applied first to the forward corner of the heel adjacent to its breast and, as the jack is rotated to cause the work to pass by the tool, will treat the whole of the contour surface thereof up to the other corner until the shoe is in the position indicated in Fig. 2. Between other stations of the machine relative movement of the cam 137 and the jack-carrying table will take place, which will cause an oscillation of the segmental gears 150 to return each of the jack spindles into such a position that the toe of the shoe is pointing clockwise around the table.

When the table is rotated to bring the jacking spindle and the piece of work carried thereby opposite the burnishing tool, the tool-carrying slide 215 will be moved forward under the control of the cam 71 to bring the burnishing tool into contact with the heel. It will be recalled that, when the machine is in operation, the burnishing tool is rotating constantly. This same forward movement of the carriage will be accompanied by release of the rod 258 thereby to press the stick of wax 255 against the heel. Under the action of the jack-controlling cam 137 the jack spindle will then be rotated through part of a revolution by means of the segmental gear 150, and this rotating movement will be compounded under the action of the slide 140 with an inward and outward movement, which will keep the contour surface of the heel in proper relation to the rotating tool and cause relative movement of the tool and the heel so that all parts of the contour surface of the heel will be burnished.

This action finished, the rotation of the table when the jacking treadle is again released will bring the work into position opposite the polishing brush 320, to which wax has already been applied as the treadle was depressed, and cause a similar relative movement of the work with respect to the brush so that the contour surface of the heel will be polished.

Upon the next succeeding release of the jacking treadle, the particular piece of work under consideration will proceed to the next work station where it will be treated by the beading tool 275. As the beading tool approaches the work under the control of the cam 71, proper interrelation of the tool and the rand crease will be assured by the action of the feeler member 281, which will slide up over the upper until it enters the rand crease thereby carrying the flange 285 of the beading tool into the rand crease. During subsequent relative movement of the work and the beading tool, the presser member 290 will be brought into action at the proper time near the end of such relative movement to press down the end of the welt and to allow the flange of the beading tool to pass therebelow.

Upon the next release of the jacking treadle, the rotation of the work-carrying table will bring the particular piece of work under consideration again to the jacking station A and the jacking spindle will be released by the engagement of the roll 183 (Fig. 10) with the cam 184 (Fig. 4) to allow it to drop. As the jacking spindle falls, the arm 186 will be released from the control of the groove 190 (Fig. 13) and the spring plunger 188 will tip the arm 186 forward to allow the removal of the finished work and replacement thereof by another piece of work. At the same time the entry of the roll 165 (Fig. 10) under the cam 166 will separate the clutch members 149 and 152 and release the jacking spindle so that it may be turned freely for the manipulation of the work with respect thereto. It will be remembered that this same roller 165 depresses the arm 214 to pull back the safety latch 211 and allow the operator to depress the jacking treadle.

Having described my invention, what I claim as new and desire to secure by Letters Patent of the United States is:

1. In a machine of the class described, a burnishing tool, a beading tool and a polishing tool, means for successively presenting the heel of a shoe to the treatment of each of said tools, and means for moving the heel relatively to each of said tools as each acts upon the heel to cause the tool to treat equal areas of heel surface in equal units of time from one breast corner to the other.

2. In a machine of the class described, the combination of a burnishing tool, a beading tool and a polishing tool, means for operating each of said tools at a uniform speed, means for successively presenting the heel of a shoe to the treatment of each of said tools, and means for moving the heel relatively to each of said tools as each acts upon the heel to cause the tool to treat equal areas of heel surface in equal units of time from one breast corner to the other.

3. In a machine for treating the heels of boots and shoes, the combination of a burnishing tool, a beading tool and a polishing tool, means for operating each of said tools at a uniform speed, means for successively presenting the heel of a shoe to the treatment of each of said tools, a cam, and connections between said cam and the presenting means for turning the heel successively past each of said tools at varying speeds so that each tool may act over equal areas of heel contour surface in equal units of time from one heel breast corner to the other.

4. A heel finishing machine comprising a series of heel finishing tools, a series of jacks, means to present the heels of shoes mounted on the jacks to the finishing tools, a member movable by the operative to control the presentation of the shoes on the jacks to the finishing tools, and means controlled by said movable member to apply wax to one of the finishing tools.

5. A heel finishing machine comprising a series of heel finishing tools, a jack, means for moving the jack to present the heel of a shoe carried thereby successively to the different tools, a member movable by the operative to initiate the movement of the jack, and means controlled by said movable member to apply wax to one of the finishing tools.

6. A heel finishing machine comprising a series of heel finishing tools, a series of jacks, means for moving the jacks to present the heels of the shoes mounted thereon successively to the different tools, a member movable by the operative to initiate the movement of the jacks, and wax holding means displaceable to apply wax to one of said tools by the displacement of said movable member.

7. A heel finishing machine comprising a series of rotary heel finishing tools including a rotary polishing brush, a jack, means for moving the jack to present the heel of a shoe mounted thereon successively to the different tools, a member movable by the operative to initiate the movement of the jack, a wax holder displaceable to apply wax to said rotary polishing brush, and means connecting said wax holder to said movable member to hold said wax holder in position to apply wax to said brush while said movable member is in displaced position.

8. A heel finishing machine having, in combination, a rotatable shoe supporting jack, a shaft journaled for rotation about an axis parallel to the axis of rotation of the jack, and a burnishing tool having a working face narrower than the heel to be treated mounted on the shaft and arranged at an inclination thereto to burnish the contour surface of the heel of a shoe mounted on the jack.

9. A machine of the class described having, in combination, a shaft, a finishing tool mounted for floating movement on said shaft, and a feeler supported for floating movement and yieldingly held in advance of said tool to contact with the work to be operated on and to locate a characteristic thereof, and arranged to thereby guide said tool into correct operative relation to the work.

10. A heel finishing machine having, in combination, a finishing tool and a slidingly mounted feeler member, said tool and feeler member being mounted for coordinated movement in determined relation so that as the feeler member enters the rand crease of a shoe, the finishing tool is brought into correct position to perform the finishing operation.

11. A heel finishing machine having, in combination, a shaft, a finishing tool freely movable on the shaft, a feeler for contacting with the work and freely movable within a prescribed range of movements in response to variations in a characteristic of the work, and connections from the feeler to the tool permitting the feeler to move freely in one direction relatively to the tool and constraining the tool to move in another direction with the feeler to guide the tool into operative relation to the heel of the shoe.

12. A heel finishing machine having, in combination, a finishing tool and a rand crease locating device comprising a pivoted guideway and a feeler spring-held for longitudinal movement in said guideway and constructed and arranged to ride over the curve of the upper into the rand crease of the shoe to be operated on, and connected to said finishing tool to guide the latter into operative relation to the heel of the shoe.

13. In a heel finishing machine, a jack, a heel finishing tool, means relatively to move the jack and the finishing tool into heel finishing position, and a feeler constructed and arranged to ride in advance of the finishing tool over the curve of the upper into the rand crease and connected to the finishing tool to guide it into proper heel finishing position.

14. A heel finishing machine having, in combination, a jack to support the shoe to be operated on, a heel beading tool having a rand crease entering flange, and means constructed and arranged to guide the flange of the tool into the rand crease of the shoe as the tool and the heel are brought into heel finishing relation.

15. A heel finishing machine having, in combination, a jack to support the shoe to be operated on, a heel beading tool having a rand crease entering flange, means to bring the tool and the heel of the jack-supported shoe into heel finishing relation, and means constructed and arranged to guide the flange of the tool into the rand crease of the shoe as the tool and the heel are brought into heel finishing relation.

16. A heel finishing machine having, in combination, a jack to support the shoe to be operated on, a rotary heel finishing tool having a rand crease entering flange, means to bring the tool and the heel of the jack-supported shoe into heel finishing relation and a longitudinally movable member floatingly mounted to ride over the curve of the upper of the shoe into the rand crease and connected with the finishing tool to guide the flange of the latter into the rand crease.

17. A heel finishing machine having, in combination, a jack to support the shoe to be operated on, a rotary beading tool, means to rotate the jack to bring the different parts of the heel seat edge of the heel to be operated on into contact with the tool, means to move the tool into contact with the heel to be operated on, and means constructed and arranged to locate the rand crease of the shoe and guide the tool into operative relation thereto.

18. In a heel finishing machine, the combination of a jack, a rotary heel finishing tool having a flange to enter the rand crease of a shoe supported on the jack, means relatively to move the finishing tool and the jack to bring into finishing relation the tool and the different portions of the periphery of the contour surface of the heel to be operated upon, and means constructed and arranged to engage the beveled end of the welt of the shoe and press it closely into contact with the sole as the finishing tool approaches that portion of the shoe.

19. In a heel finishing machine, the combination of a rotary heel finishing tool having a flange to enter the rand crease of a shoe supported on a jack, mechanism relatively to move the finishing tool and the jack to bring into finishing relation the tool and the different portions of the periphery of the contour surface of the heel to be operated upon, and a finger having a wedge shaped end arranged to be brought into contact with the beveled end of the welt of the shoe to press it closely into contact with the sole as the finishing tool approaches that portion of the shoe.

20. In a heel finishing machine, the combination of a support for a shoe, a rotary heel finishing tool having a flange to enter the rand crease of a shoe on said support, means to rotate said support to present the different parts of the periphery of the contour surface of the heel to said support, a member normally out of contact with said shoe arranged when in contact therewith to press the welt against the sole of the shoe, and means controlled by the rotation of said support to move said member into welt pressing position as the finishing tool approaches the welt.

21. In a heel finishing machine, the combination of a jack, a beading tool having a rand crease entering flange, means to rotate said jack to present the different parts of the heel seat edge of the heel of a shoe on said jack to said tool, a member normally out of contact with said shoe, and means controlled by the rotation of said jack to press said member against the welt of the shoe to thereby press the welt against the sole as the beading tool approaches the welt.

22. In a heel finishing machine, the combination of a jack, a beading tool having a rand crease entering flange, means to rotate said jack to present the different parts of the heel seat edge of the heel of a shoe on said jack to said tool, a member having a wedge shaped end portion normally out of contact with said shoe, and means controlled by the rotation of the shoe on said jack to press the wedge shaped end of said member against the welt of the shoe to press the welt against the sole as the beading tool approaches the welt.

23. In a heel finishing machine, the combination of a jack, a beading tool having a rand crease entering flange, means to rotate said jack to present different parts of the heel seat edge of the heel of a shoe on said jack to said tool, a finger having a wedge shaped end portion, means tending to move said finger into shoe engaging position, a clutch member restraining such movement of said finger and normally holding it out of contact with said shoe, a rod displaced by impact thereagainst of the shoe towards the end of the rotation of the jack and thereby rendering inoperative said clutch member and permitting said finger moving means to thrust the wedge shaped end of said finger against the welt of the shoe to press the welt against the sole as the beading tool approaches the welt.

24. In a machine of the class described, a support for a shoe, means to operate on a shoe supported thereby, a support mounted for rocking movement adjacent thereto, and a finger carried by said latter support at a position eccentric to the axis of rotation of the support and of a curvature concentric with the axis of rotation of said support, and arranged to support a joint of the shoe being operated on by said means.

25. In a machine of the class described, a support mounted for rocking movement, a finger carried by said support and mounted for limited rocking movement about an axis at an angle to the axis of rotation of the support and provided with a wedge-shaped end formed to ride up over the curvature of the upper of a shoe as the finger and the shoe are brought into contact to engage the end of the welt of the shoe and press the same into contact with the sole of the shoe.

26. In a machine of the class described, a support, means for intermittently rocking said support about an axis, a finger mounted on said support for limited rocking movement about an axis at right angles to the axis of said support, the end of said finger being formed to engage the beveled end of the welt of a shoe and as the support is rotated press the welt into engagement with the sole of the shoe.

27. In a machine of the class described, a shoe operating instrumentality, a support adjacent thereto, means for rocking said support about an axis, and a finger having a wedge-shaped end and connected to said support at a point eccentric to the axis thereof and of a curvature concentric with said axis, to engage a part of a shoe being operated upon.

28. In a shoe making machine, a support, a spindle mounted for longitudinal movement therein, a jack pivoted to said spindle, means tending to swing said jack about said pivot out of alinement with said spindle, a cam track mounted on said support, and a cam engaging member carried by said jack to swing said jack into alinement with said spindle as said spindle is moved in one direction and to permit said jack to swing out of alinement with said spindle as said spindle is moved in the opposite direction.

29. In a machine for operating on shoes, in combination, a clamp to hold a shoe, means to coat the surface of a shoe held thereby and to operate on the coated surface, a member to actuate the clamp, and mechanism set in operation by movement of said member to move a clamped shoe into position to be acted upon by said means.

30. In a machine for operating on shoes, in combination, a clamp to hold a shoe, means to coat the surface of a shoe held thereby and to operate on the coated surface, and mechanism to move a clamped shoe into and out of co-operative relation to said means, and thereafter to release the shoe from the clamp.

31. A heel-finishing machine comprising a heel-finishing tool, a jack, means for moving the jack to present the heel of a shoe carried thereby to said tool, an operator-controlled member constructed and arranged to control the movement of the jack, and means controlled by said operator-controlled member to apply wax to the finishing tool.

32. A heel-finishing machine comprising a rotary polishing brush, a jack, means for moving the jack to present the heel of a shoe to said brush, an operator-controlled member movable to control the movement of the jack, a movable wax holder arranged to apply wax to said brush, and means connecting said wax holder to said operator-controlled member to hold the wax holder in applying position when the operator-controlled member is in displaced position.

33. A heel-finishing machine having, in combination, a rotatable shoe-supporting jack, a shaft journaled for rotation about an axis parallel to the axis of rotation of the jack, and a rotatable burnishing tool mounted on said shaft and having a working face narrower than the heel to be treated, said tool being constructed and arranged to move up and down the height of the heel as the jack is rotated to present various parts of the heel surface to the tool.

34. In a heel-finishing machine, a shoe-supporting jack, a shaft, a heel-finishing tool mounted for rotation with and to float on the shaft, means to effect relative movement of the jack and the finishing tool to bring them together in heel-finishing position, and a feeler connected to said tool constructed and arranged to engage the rand crease of a shoe supported upon said jack in advance of the engagement of the tool with the heel and to guide the finishing tool into proper proper finishing position with respect to said rand crease by varying its position on the shaft.

35. A heel-finishing machine having, in combination, a rotary heel-finishing tool having a rand crease entering flange, a shoe-supporting jack movable about an upright axis to present various portions of a shoe carried on said jack to said tool, means for causing relative movement of the tool and the jack to bring the tool into heel-finishing relation to the heel of the shoe supported upon the jack, and a member mounted for up and down and in and out movement with respect to the shoe co-operating with said tool and constructed and arranged to engage the rand crease of the shoe to guide the flange of the finishing tool into said rand crease as the shoe and the tool are brought into operative relation.

In testimony whereof I have signed my name to this specification.

ALFRED B. FOWLER.